(12) United States Patent
Correa et al.

(10) Patent No.: US 6,340,114 B1
(45) Date of Patent: Jan. 22, 2002

(54) IMAGING ENGINE AND METHOD FOR CODE READERS

(75) Inventors: Mark Correa, Lake Grove; Rubin Gelles, New York; Duanfeng He, Farmingville; Eugene Joseph, Coram; Yajun Li, Oakdale; Mehul Patel, Fort Salonga; Thomas M. Stankelis, Islip, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/096,578

(22) Filed: Jun. 12, 1998

(51) Int. Cl.[7] .................. G02B 26/08; G06K 7/10
(52) U.S. Cl. ............... 235/462.22; 235/462.01
(58) Field of Search ............ 235/462.01, 472.01, 235/470, 456, 462.22, 462.23, 462.24, 462.06

(56) References Cited

U.S. PATENT DOCUMENTS

| | | | |
|---|---|---|---|
| 4,251,798 A | 2/1981 | Swartz et al. ............ 340/146.3 |
| 4,843,222 A | * 6/1989 | Hochgraf .................... 235/470 |
| 5,210,398 A | * 5/1993 | Metlitsky ............... 235/462.01 |
| 5,291,009 A | 3/1994 | Roustaei .................... 235/472 |
| 5,308,966 A | * 5/1994 | Danielson et al. ..... 235/472.01 |
| 5,349,172 A | 9/1994 | Roustaei .................... 235/472 |
| 5,354,977 A | 10/1994 | Roustaei .................... 235/472 |
| 5,414,251 A | * 5/1995 | Durbin .................. 235/472.01 |
| 5,532,467 A | 7/1996 | Roustaei ................ 235/462.01 |
| 5,550,366 A | 8/1996 | Roustaei ................ 235/462.01 |
| 5,561,283 A | 10/1996 | Dvorkis et al. ........ 235/462.01 |
| 5,703,349 A | 12/1997 | Meyerson et al. .......... 235/472 |
| 5,736,725 A | * 4/1998 | Danielson ............. 235/462.01 |
| 5,764,785 A | 6/1998 | Jones et al. ................. 382/106 |
| 5,796,089 A | * 8/1998 | Marom .................. 235/472.01 |
| 5,814,803 A | * 9/1998 | Olmstead et al. ...... 235/462.01 |
| 5,793,003 A | * 11/1998 | Feng et al. ............ 235/472.01 |
| 5,902,988 A | * 5/1999 | Durbin .................. 235/472.01 |

FOREIGN PATENT DOCUMENTS

| | | |
|---|---|---|
| EP | 0517956 A1 | 12/1992 |
| FR | 2673738 A1 | 9/1992 |
| JP | 401224887 A | 9/1989 |

OTHER PUBLICATIONS

Publication IR–2000 Features & Specifications, Metanetics Corporation, MET02–002 12/96.
IMAGETEAM® 4400 Series, Welch Allyn, ISL 391, Rev. E, 6/97.

\* cited by examiner

*Primary Examiner*—Karl D. Frech
(74) *Attorney, Agent, or Firm*—Burns, Doane, Swecker & Mathis, L.L.P.

(57) ABSTRACT

An imaging engine and signal processing devices and methods are disclosed for reading various kinds of optical codes. The compact structure may include a two dimensional image sensor, apparatus for focusing images at different focal disclosures, an aiming system, a hi-low beam illumination system and related signal processing circuits.

52 Claims, 24 Drawing Sheets

IMAGING ENGINE AND METHOD FOR CODE READERS

FIELD OF THE INVENTION

The invention relates to imaging, aiming and target illumination in optical code reading devices. Aspects of the invention are particularly useful in solid state, area image sensor based, handheld code readers which are positioned at variable orientations and distances with respect to a target code.

BACKGROUND OF THE INVENTION AND OBJECTS

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type. Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described may also be applicable to some associated image recognition or analysis.

Most conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two dimensional barcodes is disclosed in U.S. Pat. No. 5,561,283, also assigned to Symbol Technologies, Inc.

Barcodes can also be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electronic signals corresponding to a two-dimensional array of pixel information for a field of view.

Many scanners in use today employ a scanning laser beam. Some such systems are deployed in handheld units which may be manually pointed at the target. Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE 1200 form factor employed by Symbol Technologies, Inc.

It is an object of the present invention to provide a compact imaging engine which can be substituted for conventional laser line scanning engines in currently designed and currently deployed optical code reader systems.

It is another object of the present invention to provide an imaging engine which can be substituted for SE1200 form factor scanning engines in currently designed and currently deployed optical code reading systems to increase the reliability, versatility and target working range of such systems.

It is known in the art to use a CCD photo detector and objective lens assembly in an optical code reader. In the past, such systems have employed complex objective lenses assemblies originally designed for use in relatively expensive video imaging systems. Such lens assemblies typically employ multiple, large diameter, aspheric lens elements. Use of aspheric lens elements and a CCD photo detector in a code reader is illustrated in U.S. Pat. No. 5,703,349. Aspheric lens systems are relatively costly and difficult to build. They also have a single sharp focus and a limited depth of field, which along with conventional aiming, illumination and signal processing and decoding algorithms, limits the versatility and working range of the system.

Applicants assignee, Symbol Technologies, Inc. has developed bi-stable high speed zone collection systems for barcode scanners. Systems which employed lens structures moveable into the input optical path of the scanner (drop-in optics) are disclosed in U.S. patent application Ser. Nos. 08/627,167 and 08/627,168 filed Apr. 3, 1996 to Li et al.

It is an object of the present invention to provide an easily constructed and inexpensive objective lens assembly for an imaging optical code reader.

It is another object of the present invention to provide an optical code reader which can be used to read codes at a wide range of distances.

It is another object of the present invention to provide an imaging optical code reader with selectable fields of view and working depths of view appropriate to the signal processing and decoding capabilities of the reader.

Various approaches have been proposed for aiming optical code readers. The simplest approach is to use the familiar red projected laser lines from a laser line scanner as an indication of the aim of the device. In passive, imaging systems, it has been proposed to project beams toward the target for aiming purposes. The device shown in U.S. Pat. No. 5,703,349 projects laser light from two targeting lens elements to form so called "hot spots" in the target area at an angle corresponding to the horizontal field of view of the system. An improved aiming system is disclosed in U.S. patent application Ser. No. 08/444,387 assigned to Symbol Technologies, Inc., the contents of which is incorporated herein by reference. This system employs a single laser diode and a diffractive optic element to produce multiple spots or beamlets for identifying corners or edges of a target area. This system uses different wavelength light for illumination and aiming, and appropriate optical filtering to eliminate the aiming pattern from the detected image.

It is an object of the present invention to provide an improved aiming system for an optical code reader.

It is another object of the present invention to provide a simply and inexpensively fabricated aiming system for an optical code imaging engine.

It is another object of the present invention to project an aiming pattern useable by the operator to aim the device and to provide data useful to the overall system.

It is another object of the present invention to provide an optical code reader which can use an aiming system to measure distances to a target.

It is another object of the present invention to provide an aiming system adaptable with aspects of the present invention, elsewhere disclosed herein, for providing various optical fields and focal distances in an optical imaging engine.

It is known to provide illumination in optical code readers employing image sensors as a supplement to ambient light. For example, U.S. Pat. No. 5,703,349 discloses an illumination module comprised of two lines of illuminating LEDs and lens cells. Such systems are adapted for use in single working range systems.

It is an object of the present invention to provide an illumination system for an optical code reader which is readily fabricated and provides sufficiently intense and uniform illumination for code reading.

It is another object of the present invention to provide an illumination system for an optical code reader which provides illumination adapted for different working ranges.

Some or all of the objects previously described may be achieved in a single optical code reading engine or system. With the addition of appropriate control circuitry and data processing software, a system may be constructed serving the object of producing a compact, inexpensively fabricated imaging engine which may be substituted for existing line scan engines. The engine may be adapted for use in many different environments, with various optical fields and focal distances, for reading various codes of different size. The system may also be used for image recognition or analysis, including acquisition of data concerning the target and its environment.

These and other objects and features of the invention will be apparent from this written description and drawings.

SUMMARY OF THE INVENTION

The present invention relates to methods and apparatus useful in optical code readers, especially imaging optical code readers. Techniques are disclosed which are applicable to the design of imaging engines, imaging lens systems, and aiming, illumination and signal processing devices associated with code readers of various types.

An imaging and aiming apparatus for an optical code reader may be based on an image sensor, including an array of photo sensor cells for producing electronic signals corresponding to a two-dimensional array of pixel information for a field of view. In preferred embodiments, the image sensor is a charge coupled-device (CCD), it being understood that other area image sensors may be used for the purpose such as CMOS, CMD (charge modulated device) or CID (charge injection device) sensors. A lens assembly is provided for focusing light incident on the image sensor. In preferred embodiments the lens assembly is switchable between at least two different fields of view, corresponding to at least two different focal distances. Advantageously, a control mechanism is provided to rapidly switch the lens assembly between fields of view and fixed focal distance lenses. In preferred embodiments, an aiming pattern generator projects at least two different aiming frames, each indicating a field of view of the lens assembly.

The above-described apparatus may constitute part of an imaging engine which also includes a power supply, decoding circuitry and video controller circuitry. In preferred embodiments, the imaging engine is less than two cubic inches in volume and is dimensioned to replace a moving laser beam scanning engine in a handheld barcode scanner, such as an SE1200 form factor scanning engine. Such an imaging engine may be designed to read a variety of types of optical codes including high and low density barcodes at a working range of between 1½ and 18 inches, or more.

The aiming pattern generator of preferred embodiments of the present invention produces multiple aiming frames having different, partially overlapping, solid angle fields or dimensions corresponding to the different fields of view of the lens assembly. The aiming pattern may also include a centrally located marker or cross hair pattern. Each aiming frame may consist of four corner markers each comprising a plurality of illuminated spots, for example two multiple spot lines intersecting at an angle of 90°.

The aiming pattern generator may include at least one laser diode. A laser light beam from the diode impinges at least one diffractive optical element. In preferred embodiments, the diode beam is folded in order to align, in parallel, the principal optical axis of the aiming pattern generator with the principal axis of the lens assembly such that there is a small offset between the two, typically no more than 1".

The image sensor may sense an image of all or a portion of the aiming pattern, particularly the center marker or cross-hair pattern. Image analysis circuitry or software may be provided to process pixel information from two images of the same target field of view, one with and one without an image of the centrally located marker. The distance of a target code may be determined based on the apparent location of the centrally located marker in the field of view. In furtherance of this approach, the aiming pattern generator may be periodically turned off during which time pixel information of the target field is obtained for decoding without the image of the centrally located marker.

The imaging systems of the present invention may further include frame grabbing circuitry for providing video signals for displaying images produced by the apparatus on a terminal monitor. In this case hardware modification of existing terminals may be avoided. Software or hardware switching may be provided for selectively turning off the aiming pattern projector when the apparatus is used to obtain pixel information for image display, for example when the device is used to produce an image of the human face, without projecting the laser aiming pattern on the face.

In preferred embodiments of the present invention the lens assembly includes first and second lenses, each lens having a different field of view. The lenses may be compound lenses made up of multiple lens elements aligned on the same optical axis. In preferred embodiments, the lenses have apertures less than 1/10" in diameter. The lenses themselves may include inexpensive molded plastic spherical lens elements. Each lens may include two concave-convex lenses with spherical convex surfaces and diameters less than 1/2". The lens elements may be snap fit in an alignment tube or barrel to maintain the lenses in position on a common optical axis in back-to-back relationship.

Advantageously, a moving optical element is provided for selectively providing an image to the image sensor through one of the first or the second lenses. The moving optical element may be a fast acting, moving mirror which folds the optical path of at least one of the lens units. An electronic servo mechanism may be used to control the mirror.

Imaging engine embodiments of the present invention may also include a target illumination source which emits light from a forward face of the engine. The illumination source may have two or more illumination fields or beams corresponding to different fields of view or focal depths of the lens assembly. The illumination source may produce a relatively broad beam of lower output intensity to illuminate a target barcode relatively close to the reader, and a relatively narrower beam of higher output intensity to illuminate a target barcode relatively far from the reader. A portion of the illumination source for producing the lower output intensity illumination beam may comprise one or more light emitting elements with a wide divergence pattern located relatively near a principal optical axis of the lens assembly. Additional elements may be used to provide a longer range illumination beam of higher output intensity. In a preferred embodiment, this function is performed by light emitting elements with a narrow divergence pattern located relatively farther from a principal optical axis of the scanner. These latter elements may be plural light emitting diodes each associated with a focusing lenslet located in a front face of the reader.

In an illumination system using plural light emitting elements, certain intensity variations may occur across the illuminated field. In preferred embodiments of the present invention, image processing circuits and/or software compensates signals from the image sensor for known variations in illumination provided by the illumination source.

Preferred embodiments may include circuitry and/or software for processing and decoding image data received from the image sensor. An image sensor produces electronic signals corresponding to a two-dimensional array of pixel information for a target image. This data is analyzed by circuitry/software based systems to determine black and white threshold information. The pixel data is divided into subimages, for example, 32×32 pixel subimages. These subimages are analyzed for properties known to be associated with various types of optical codes and known to distinguish a particular code from other codes and from environmental (non-code) images.

In preferred embodiments, an auto-discrimination system determines which subimages contain codes of a particular type and the coordinates in the pixel data array of certain boundaries or features of preliminarily identified code areas. Further circuitry and/or software extracts one or more waveforms from the data in image areas of interest. Peaks and valleys in the waveforms are identified. A digitizer converts this information to electronic signals corresponding to the code content of the image. The output of the digitizer is applied to a decoder which provides a decoded data output or indicates a failure to decode, which may then trigger additional auto-discrimination in a further attempt to identify and locate a decodable image.

The image processing circuitry/software may be employed to analyze a portion of the projected aiming pattern in the pixel information produced by the image sensor. This information may be used to provide feedback to the processing circuitry to help identify an image area in which a target barcode is located. Such image processing may also be used for determining the distance between the reader and the target barcode. This information, in turn, may be used to select an illumination level for a subsequent image to be decoded, and to control the illumination source. Alternatively, the information may be used to select a focal distance for a subsequent image to be decoded and to control the lens assembly associated with the image sensor to switch different objective lenses into the input optical path of the image sensor.

The scope of the present invention is as defined in the claims.

BRIEF DESCRIPTION OF THE DRAWINGS

System Overview—Mechanical, Optical And Electrical Arrangement

Objective Lens Assemblies

Figure 8B:
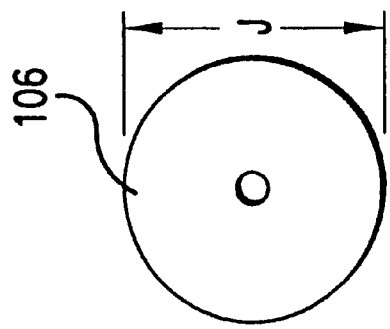
Figure 8A:
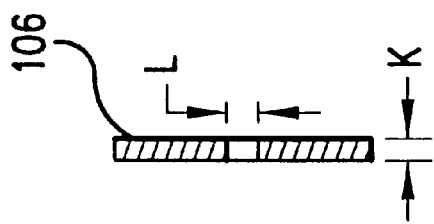
Figure 7:
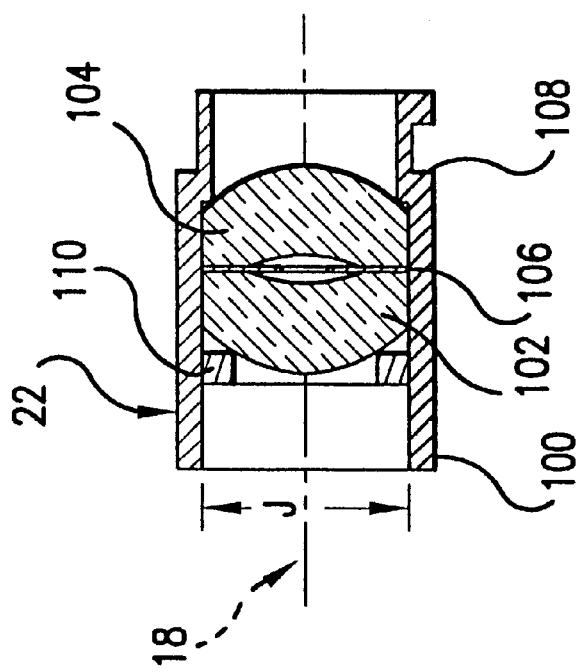
Figure 9:
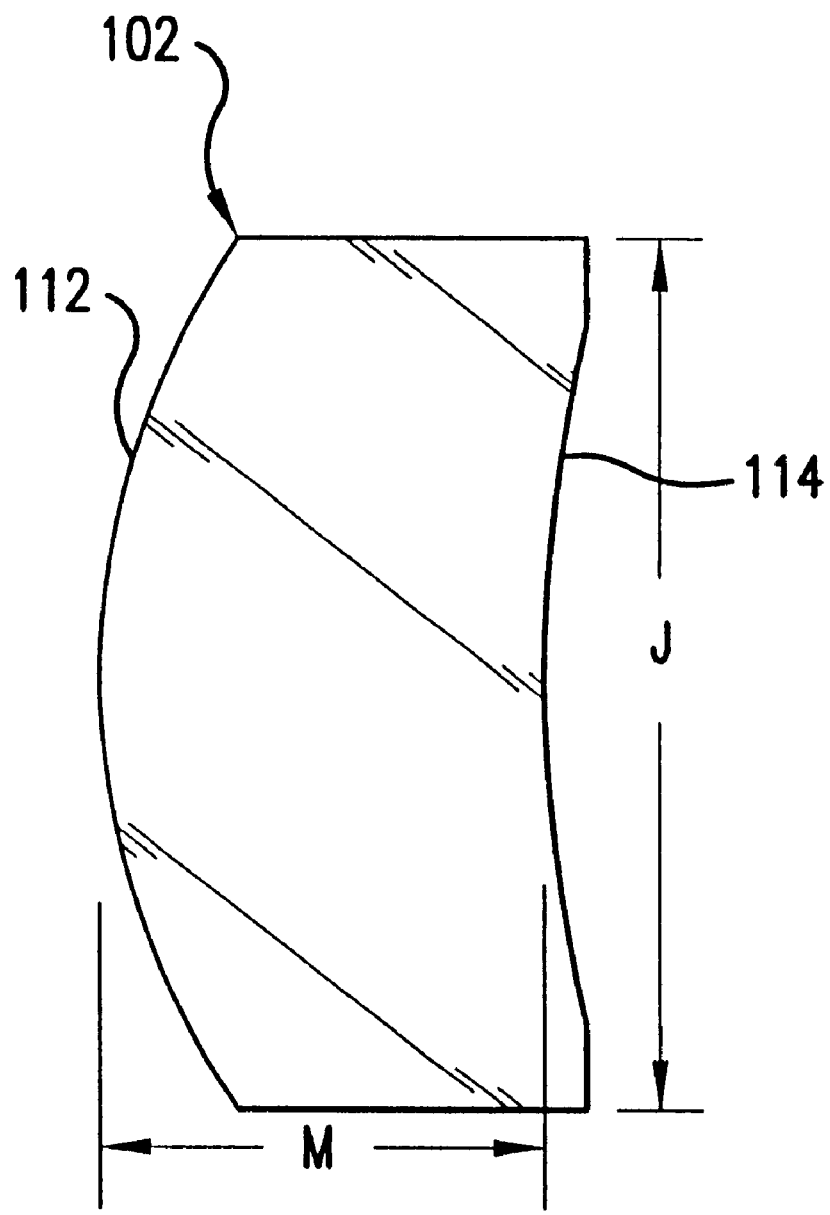
Figure 10:
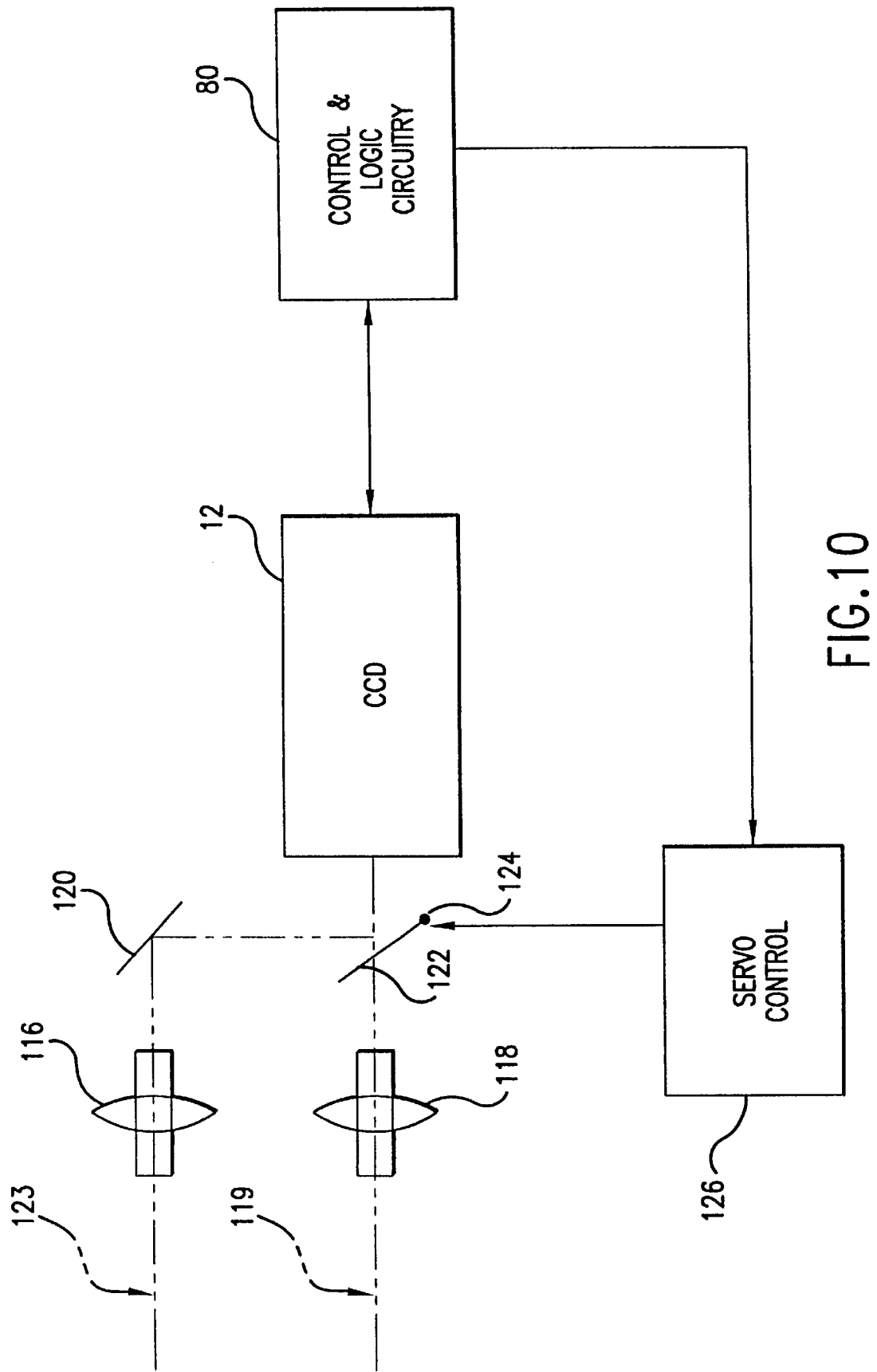

FIG. 7 is a sectional view of an objective lens assembly made in accordance with a preferred embodiment of the present invention;

FIGS. 8a and 8b are, respectively, front and cross sectional views of an aperture plate used in the lens assembly of FIG. 7;

FIG. 9 is a sectional view of a lens element used in the lens assembly of FIG. 7;

FIG. 10 is a block diagram of a switchable lens assembly made in accordance with a preferred embodiment of the present invention.

Aiming System

Figure 11:
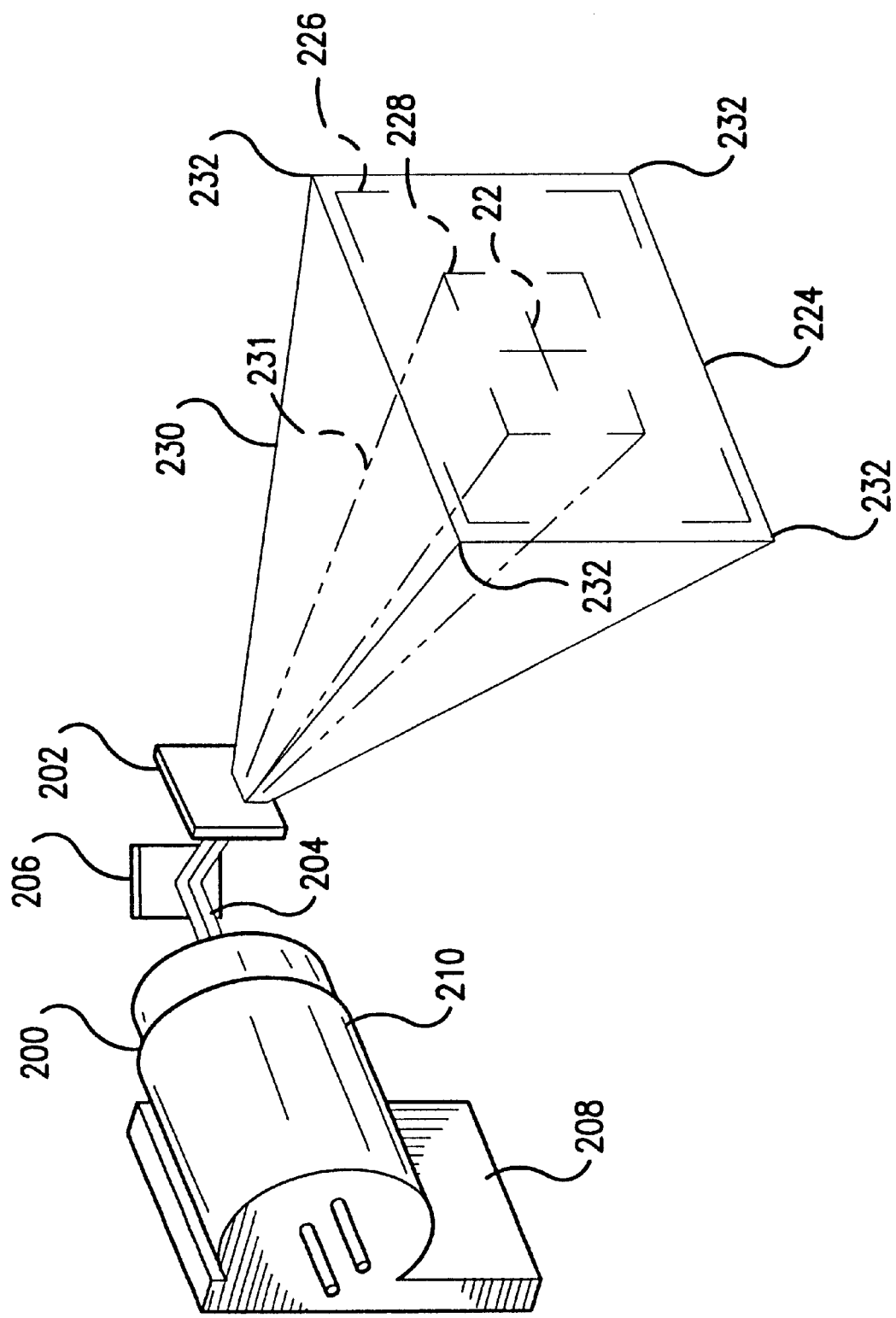
Figure 12:
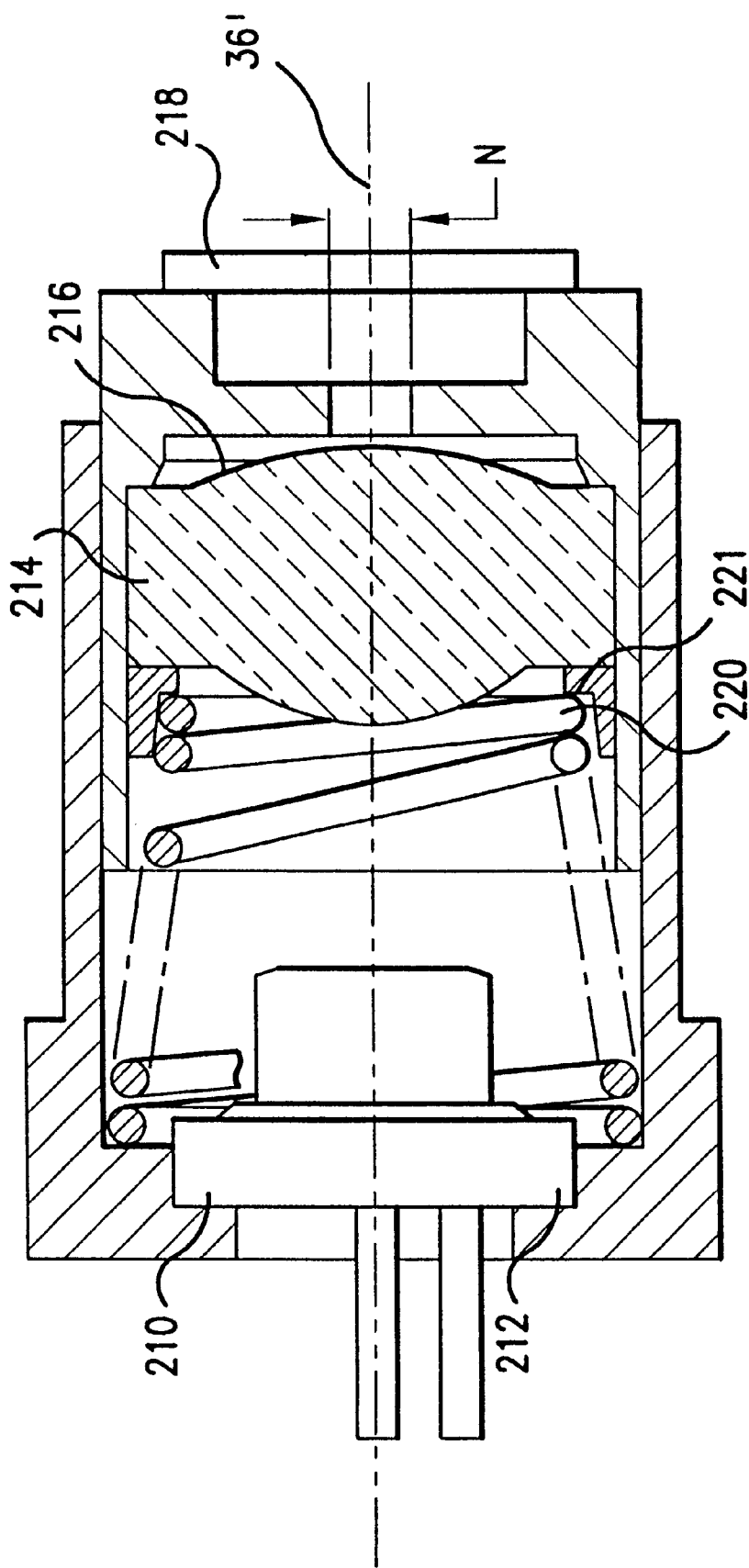

FIG. 11 is a pictorial view of an aiming system of a preferred embodiment of the present invention and a projected aiming pattern at a target plane;

FIG. 12 is a sectional view of an aiming pattern beam source employed in a preferred embodiment of the present invention.

Illumination System

Figure 13:
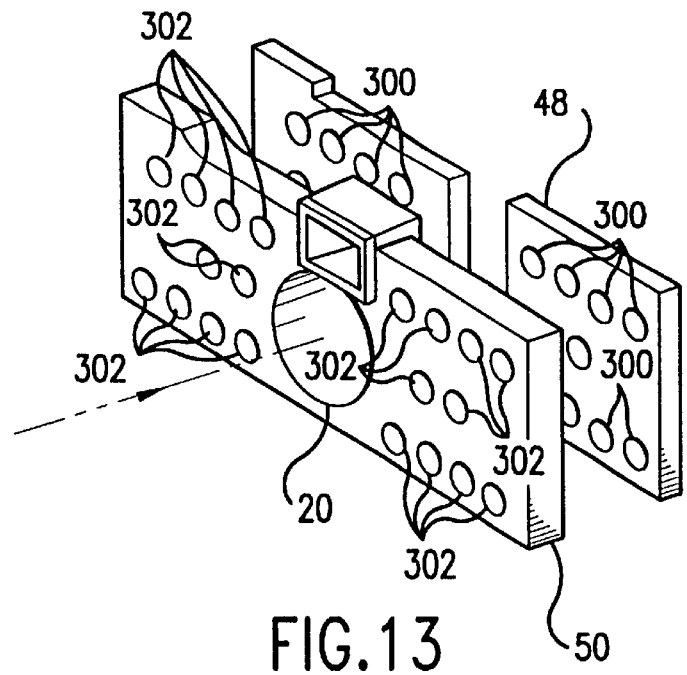
Figure 14:
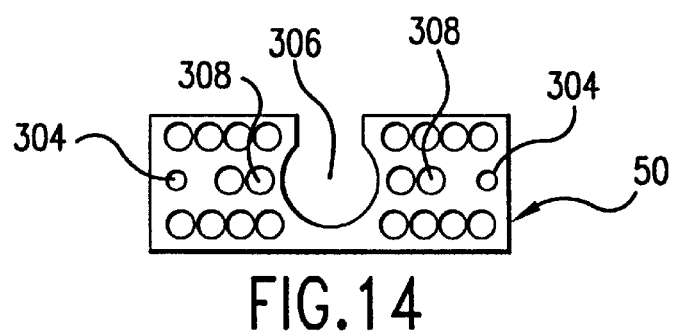
Figure 15:
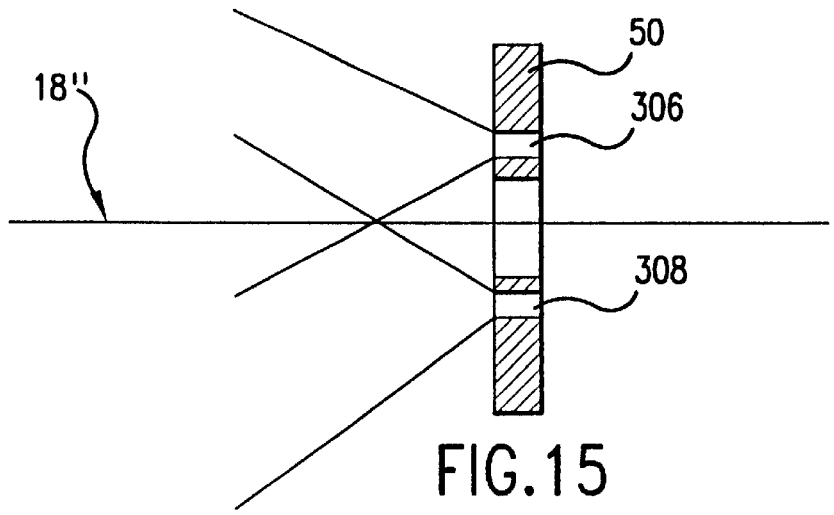
Figure 16:
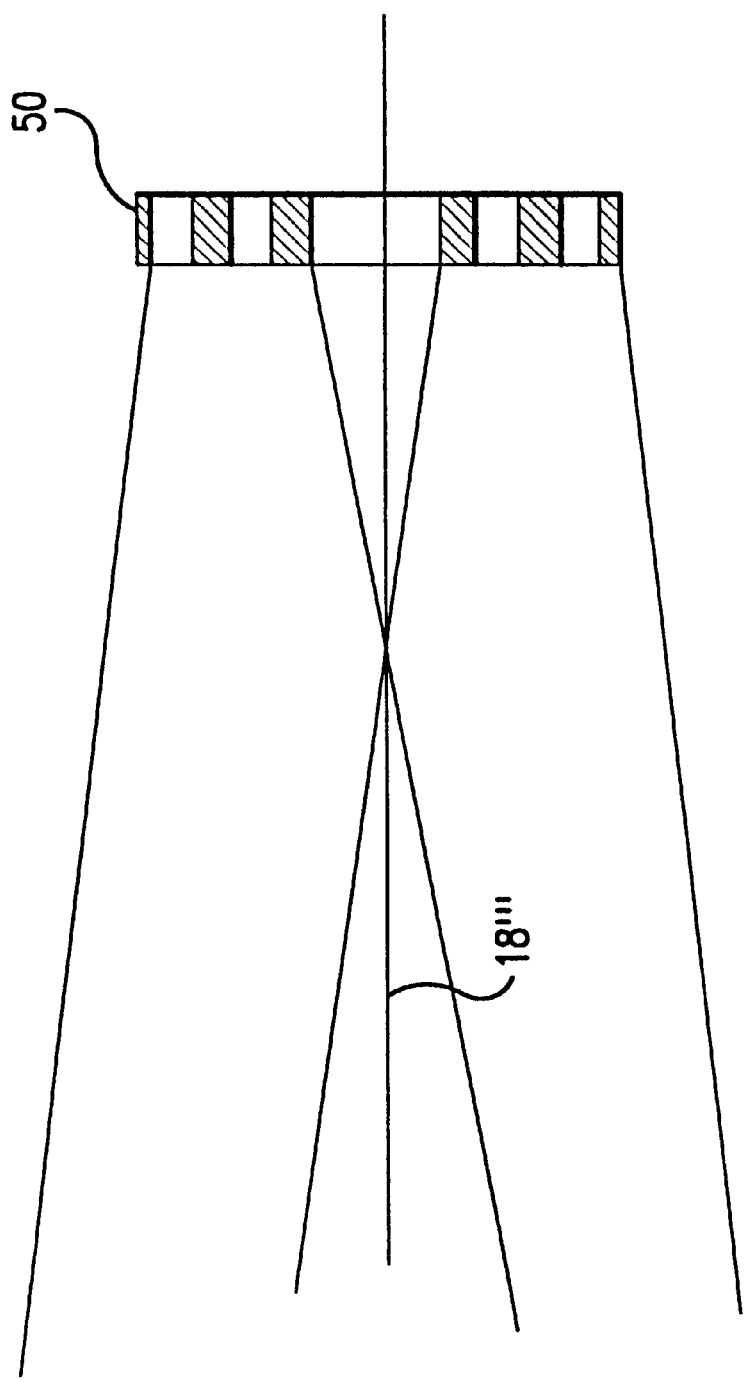

FIG. 13 is a partially exploded pictorial view of the front face of an imaging engine of a preferred embodiment of the present invention;

FIG. 14 is a front view of an illumination panel shown in FIG. 13;

FIGS. 15 and 16 are schematic plan views illustrating two illumination patterns produced by the illumination system shown in FIG. 13.

Electrical Arrangement

Figure 17:
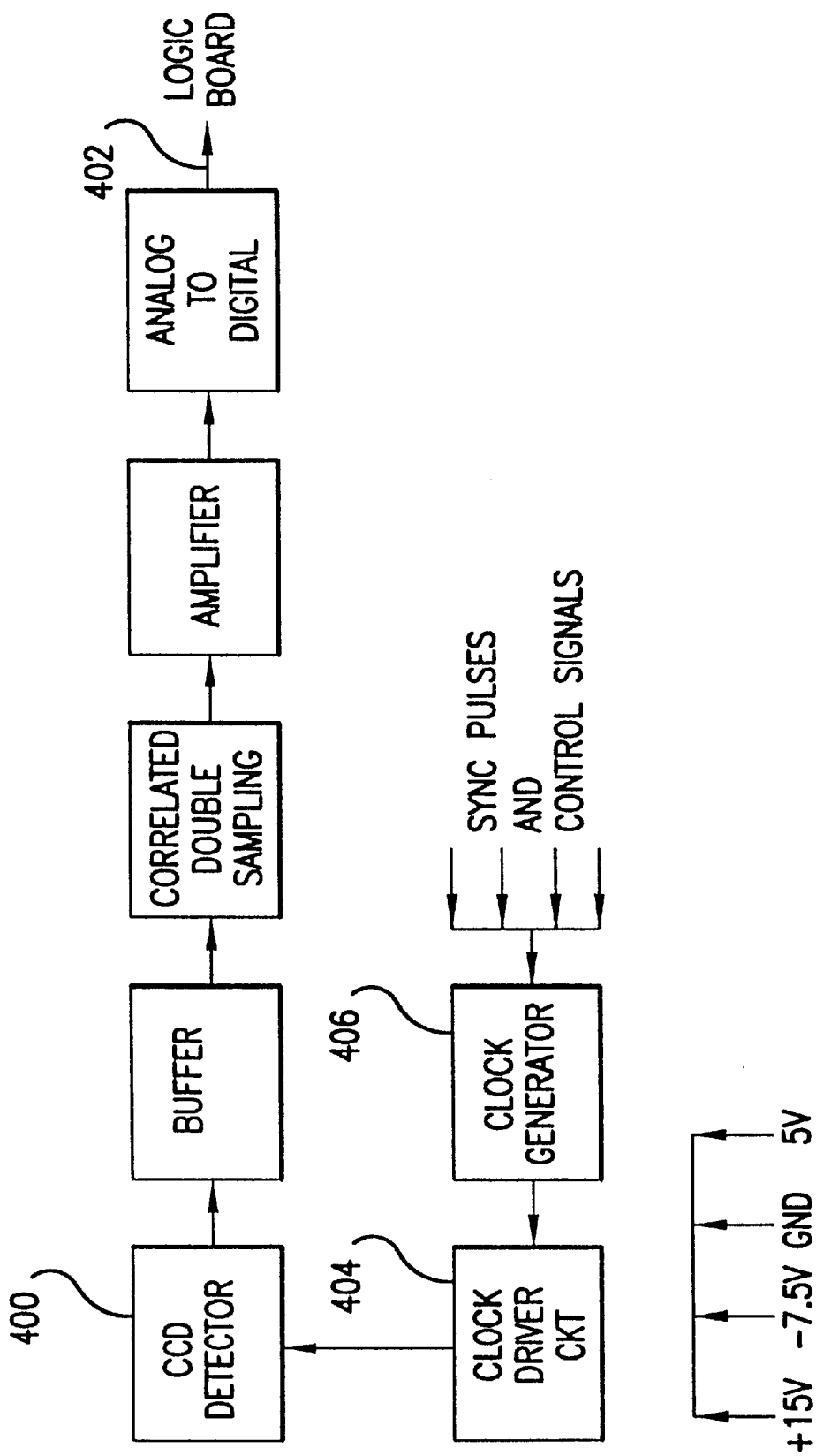
Figure 18:
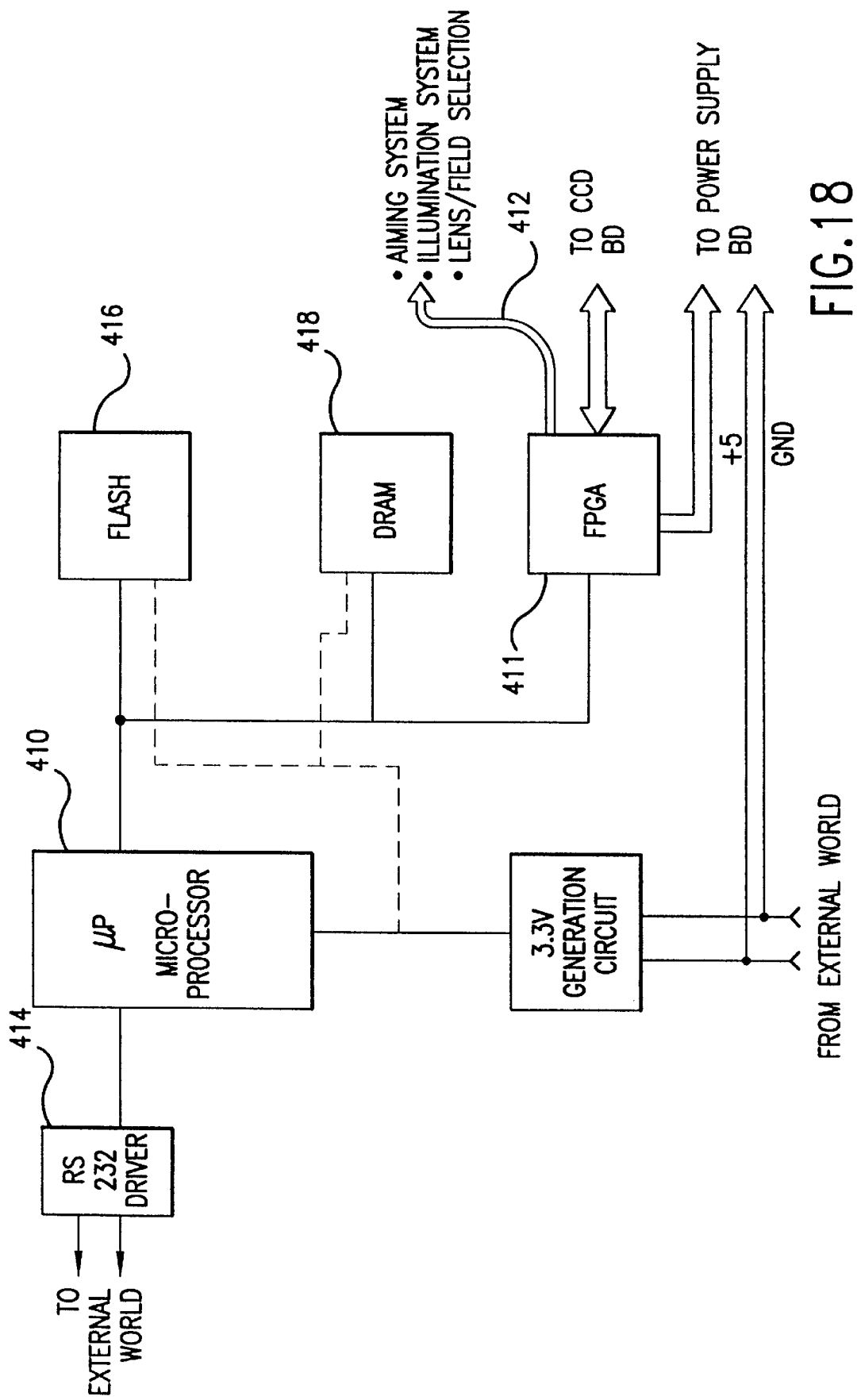
Figure 19:
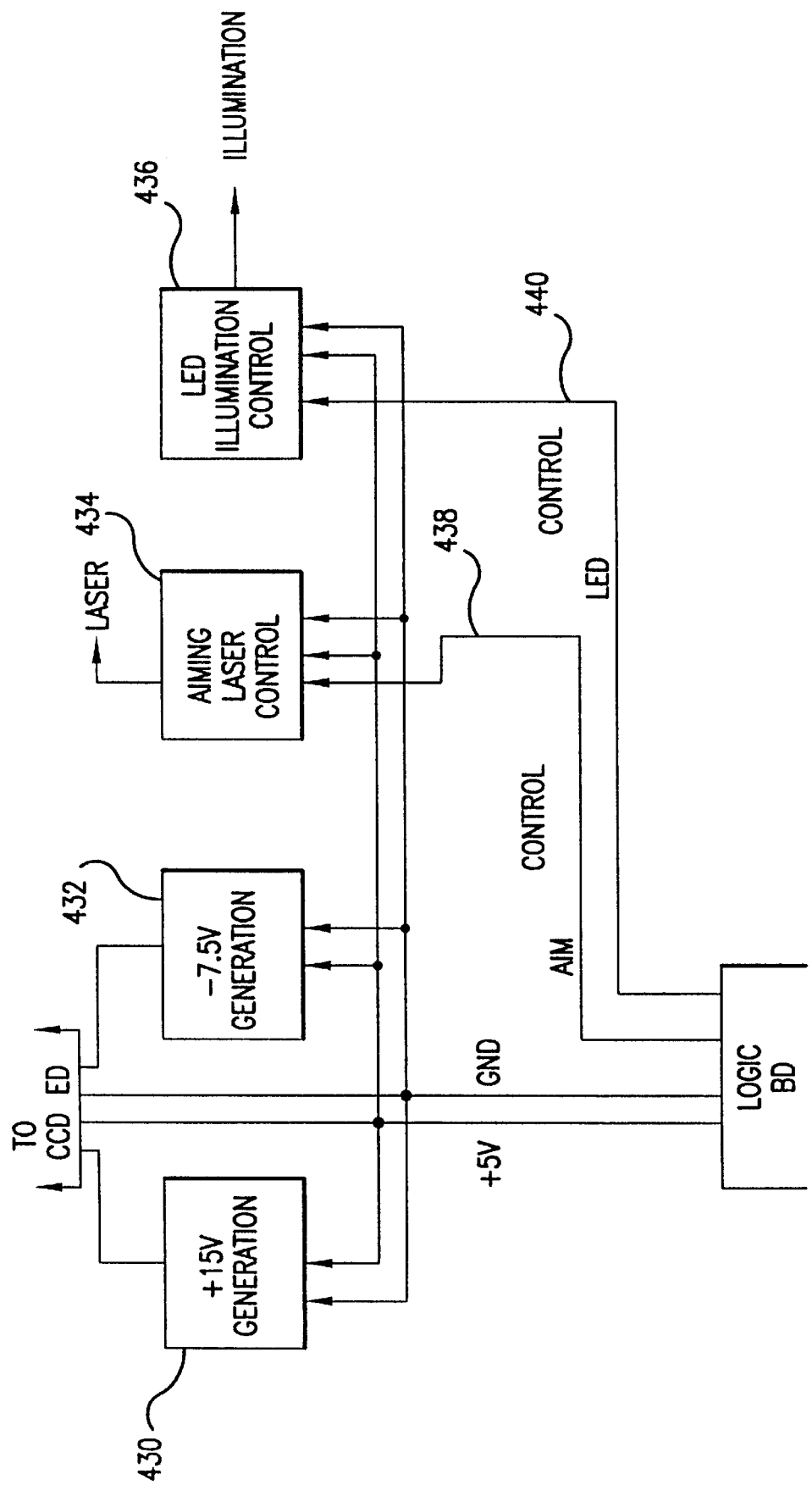

FIG. 17 is a block diagram of a CCD circuit board employed in a preferred embodiment of the present invention;

FIG. 18 is a block diagram of a logic circuit board employed in a preferred embodiment of the present invention;

FIG. 19 is a block diagram of an electrical power supply system employed in a preferred embodiment of the present invention.

Signal Processing And Decoding

Figure 20:
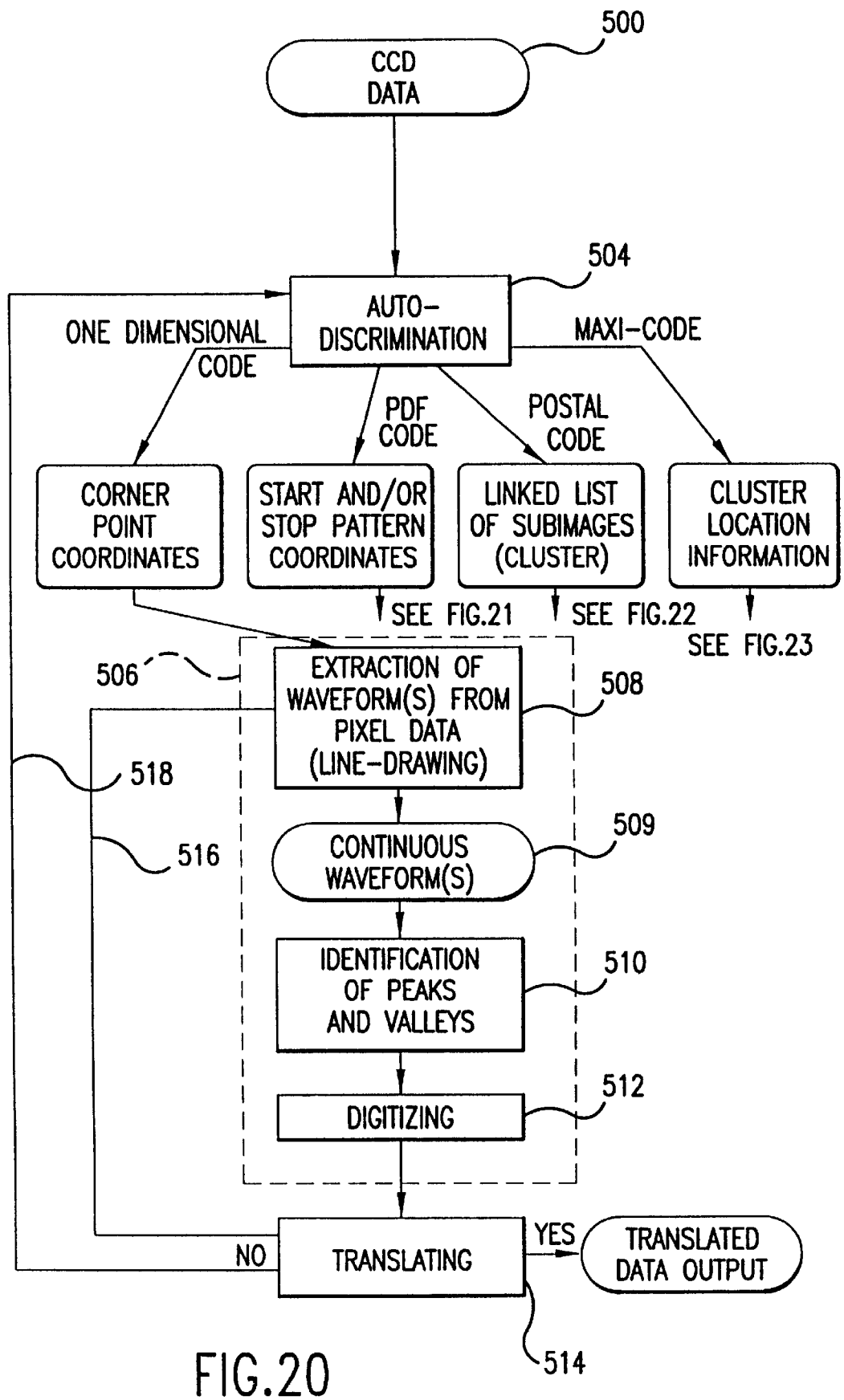

FIG. 20 is a combined flow chart and system block diagram illustrating the processing and decoding of CCD data in a preferred embodiment of the present invention.

FIGS. 21, 21(a), 22 and 23 are flow charts illustrating the processing and decoding of two dimensional pixel data.

DETAILED DESCRIPTION OF THE DRAWINGS AND PREFERRED EMBODIMENTS

TABLE OF CONTENTS

Figure 1:
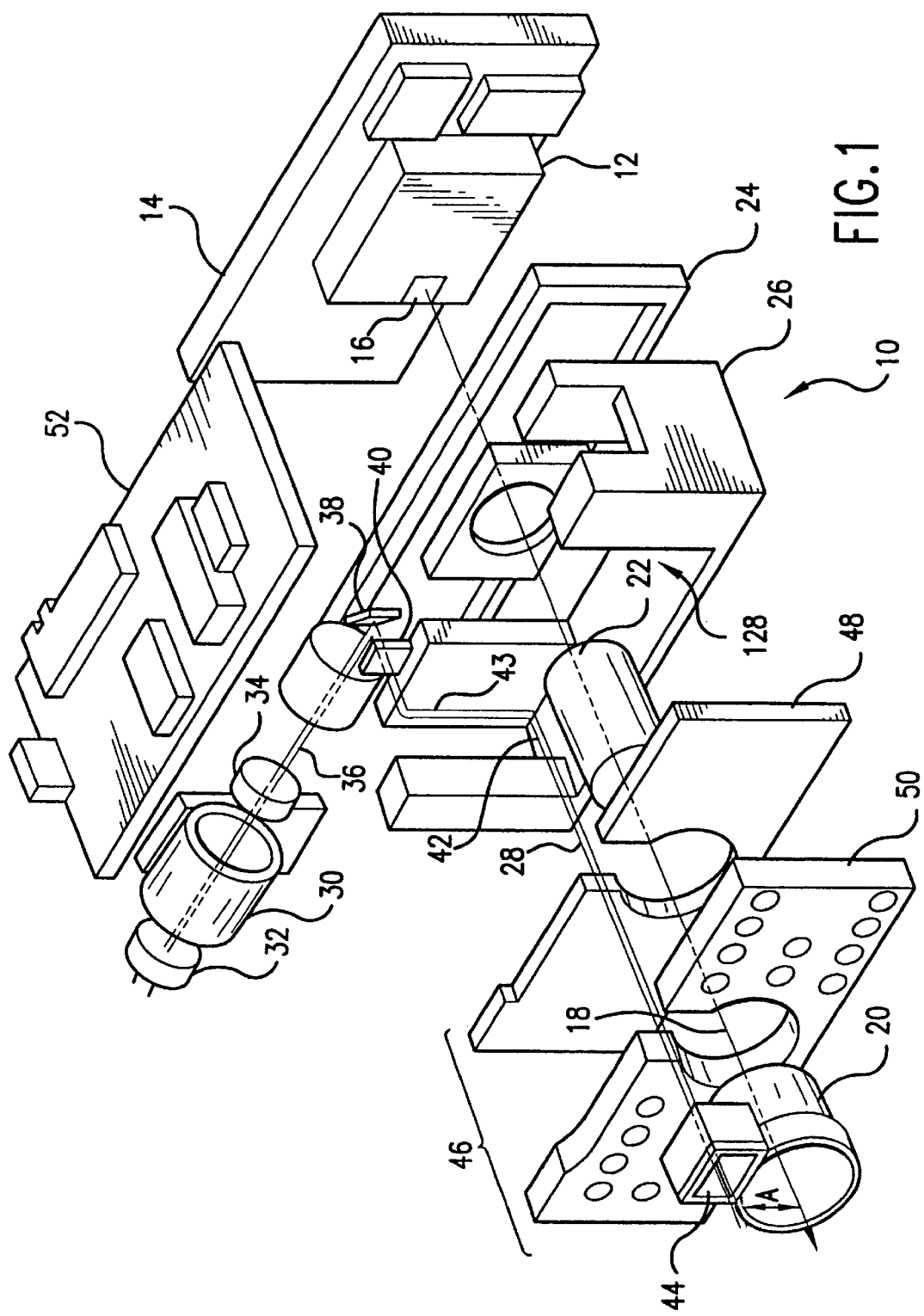
FIG. 1 is an exploded view of a miniature imaging engine of a preferred embodiment of the present invention.

I. System Overview—Mechanical, Optical And Electrical Arrangements
II. Objective Lens Assemblies
III. Aiming System
IV. Illumination System
V. Electrical Arrangement—System Control, Data Flow And Power Supply
VI. Signal Processing And Decoding I. System Overview—Mechanical, Optical And Electrical Arrangements FIG. 1 illustrates an optical code imaging engine 10 of a preferred embodiment of the present invention. The Figure is an exploded view illustrating certain optical paths and subsystems of the imaging engine. As shown, the imaging engine includes various circuit boards, optical elements and chassis elements. A packaged image sensor 12 is located on an image sensor board 14. The image sensor board 14 may also contain image acquisition circuitry associated with the image sensor 12. In a preferred embodiment, the image sensor 12 is an area CCD having a window 16 through which an incident image is received. The CCD converts the incident light into electrical signals which are processed in a manner indicated below. A suitable CCD is MN3776AE manufactured by Panasonic (Matsushita Electric Industrial Co.).

A line 18 indicates the principal optical axis of the image sensor 12 of the imaging engine 10. The principal optical axis 18 passes through an optical baffle 20 into an objective lens assembly 22 having the same principal optical axis as the system as a whole. The optical axis 18 then passes to the window 16 of the CCD package 12.

In operation, a field of view of the imaging engine is imaged by the image sensor 12. More particularly, light from the field of view passes through the optical baffle 20 and into the lens assembly 22 which focuses the light on the surface of the CCD in the CCD package 12. An array of photo sensor cells in the CCD produce electronic signals corresponding to a two dimensional array of pixel information for a target image. In preferred embodiments, the imaging engine uses fixed focus optics technology. The engine is designed to be able to acquire images in lighting conditions ranging from two lux to direct sunlight. The maximum exposure time is approximately 15 milliseconds. Advantageously, the imaging engine of FIG. 1 employs a high sensitivity CCD array having a resolution of 659×494 pixels. In preferred embodiments, the imaging engine is capable of imaging a frame with a half angle of approximately 15°. When used with the illumination system described below, the imaging engine is capable of reading codes in what is otherwise total darkness.

The image sensor board 14 carrying the CCD sensor 12 and the lens assembly 22 is mounted on chassis member 24. A second chassis member 26, together with the first chassis member, forms a rigid body for the imaging engine.

The imaging engine 10 is provided with an aiming system which will be described in connection with an optical path 28. Light for the aiming system is provided by an aiming beam generator assembly 30 which includes a laser diode 32 and a torroidal lens 34. An aiming laser beam 36 emanates from the generator assembly and is reflected by a folding mirror 38 through a diffractive optical element 40. The diffractive element 40 creates diverging beamlets which follow a path indicated by the numeral 42 (the path 42 has been stretched in the y-axis direction as indicated by the broken lines 43 in order to facilitate the rendering of an exploded view in FIG. 1). The diverging beamlets from the aiming system exit the imaging engine through a front face of the imaging engine at a window 44 in the optical baffle element 20. The location of the diffractive element 40 near the front face of the imaging engine permits a reduction in size of the engine, because space does not have to be provided within the engine for beamlet divergence.

Dimension A indicates an offset between the principal optical axis 18 of the lens assembly 22 and the beamlet path 28 which is the principal optical axis of the aiming system at the point where the aiming beamlets exit the imaging engine. The dimension A in preferred embodiments is less than ½", for example 5 mm. The significance of this dimension will be discussed in connection with the detailed description of the aiming system of the present invention.

An illumination source 46 for the imaging engine 10 is provided in preferred embodiments of the present invention. An illumination printed circuit board 48 carries light emitting diodes. A lenslet plate 50 forms the external front face of the imaging engine. Light from laser diodes on the illumination printed circuit board 48 passes through the lenslet plate 50 and provides an illumination field for the imaging engine. Power for the illumination printed circuit board is provided from the power supply board 52. Power for the other electronic components of the imaging engine including the image sensor board may also be provided by the power supply board 52.

Figure 2:
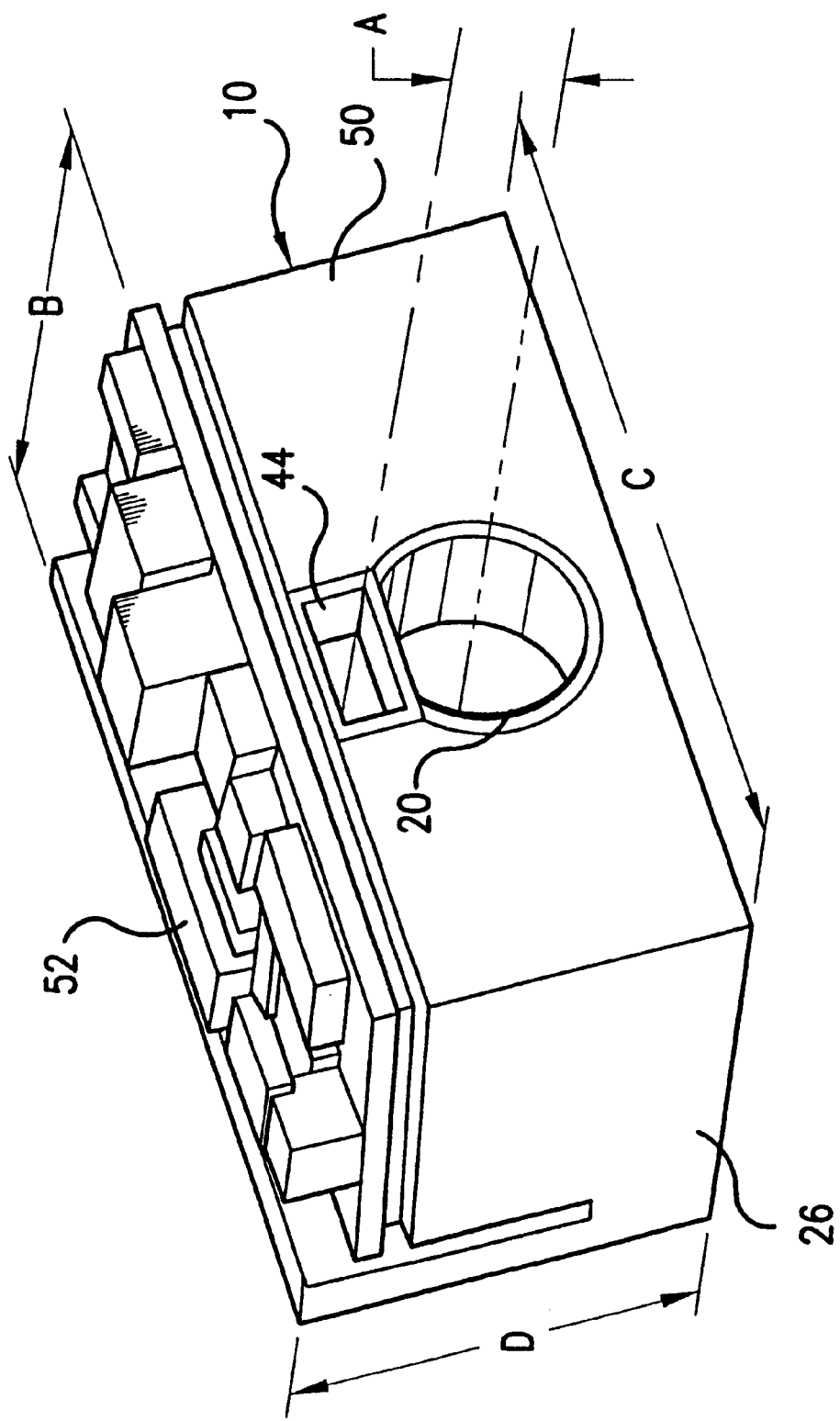
FIG. 2 is a pictorial view of the imaging engine of FIG. 1, including the front face of the engine.

Turning now to FIG. 2, the imaging engine of FIG. 1 is shown in pictorial view in its assembled form. The mechanical, electrical and optical structures described in connection with FIG. 1 cooperate together to permit the construction of an extremely compact unit. Typical dimensions for such a unit are indicated by the letters B, C and D which are respectively 1", 1.5" and 0.75" in a preferred embodiment of the present invention. The imaging engine thus has an overall volume of about 1 and ⅛ cubic inches. The front face has an area of approximately 1 and ⅛ square inches and the unit has a foot print of approximately 1½ square inches. It will be understood that in some applications a larger imaging engine may be desirable or suitable given the mounting and housing requirements of the particular environment of use. In some embodiments it may be appropriate for the engine to have a volume of about two cubic inches or even larger.

Figure 3:
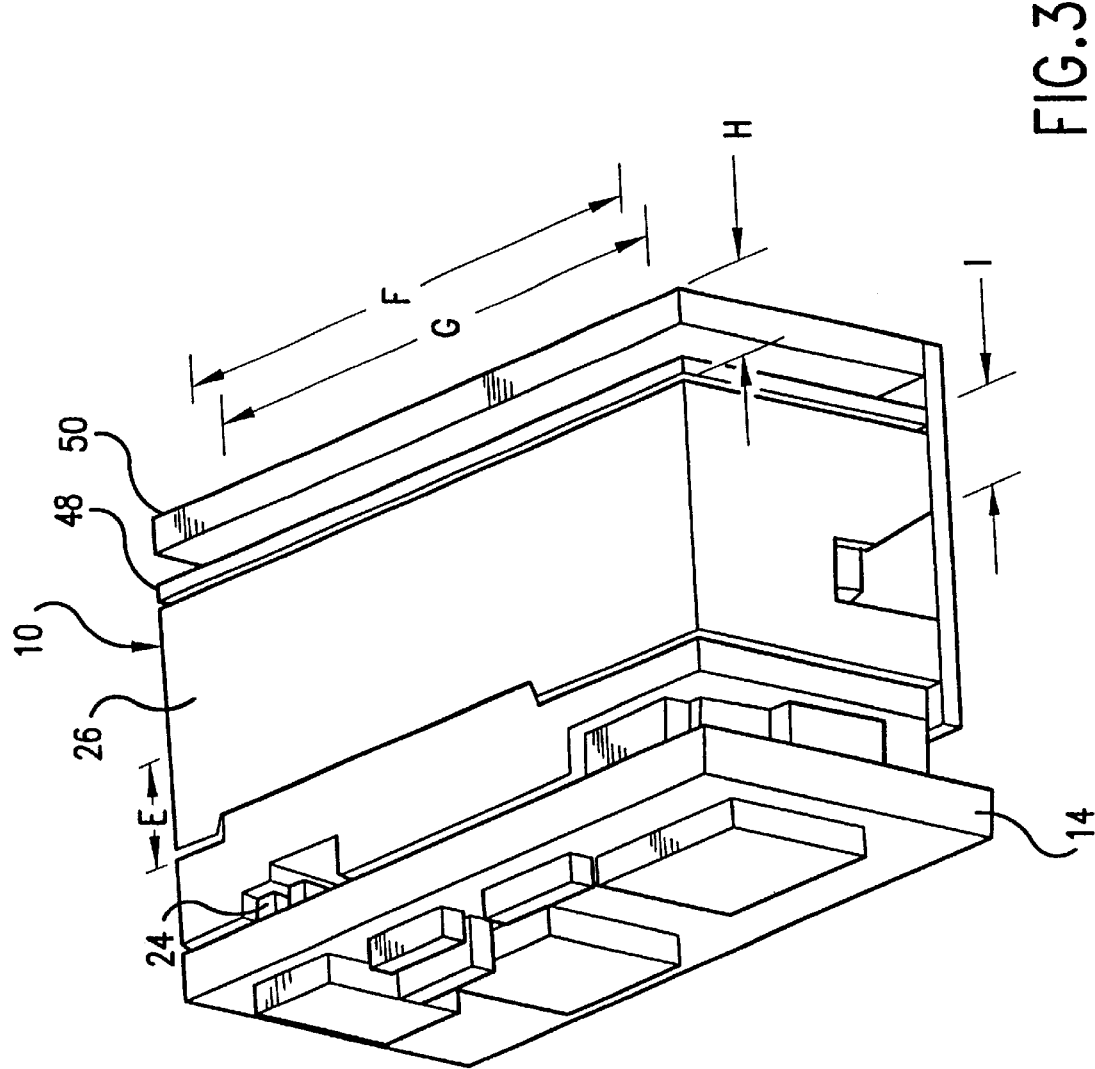
FIG. 3 is a pictorial view of the imaging engine of FIG. 1, including the rear face of the engine.

The bottom of the imaging engine 10 of FIG. 1 is illustrated in FIG. 3. FIG. 3 shows particularly well the arrangement of the chassis elements 24 and 26 in the assembled imaging engine. The Figure also shows the arrangement of the image sensor board 14 at the rear of the unit and the positions of the illumination PCB board 48 and the lenslet plate 50 at the front of the imaging engine.

Mounting holes are provided on the bottom of the imaging engine to permit the insertion of the imaging engine into existing scanner systems. The mounting holes are separated by the dimensions indicated by the letters E through I whose values in inches are indicated in the table below:

E=2.04 inches
F=1.145 inches
G=1.106 inches
H=0.235 inches
I=0.11 inches.

A preferred embodiment of the imaging engine of FIGS. 1 through 3 is in the arrangement of the SE1200 form factor. The packaging of the imaging engine in this compact form provides an easy upgrade path for a very large existing installed base of scanning devices which adhere to the SE1200 form factor. Use of this form factor greatly improves the mechanical integration of the imaging engine as a replacement for prior line scanning engines.

Figure 4:
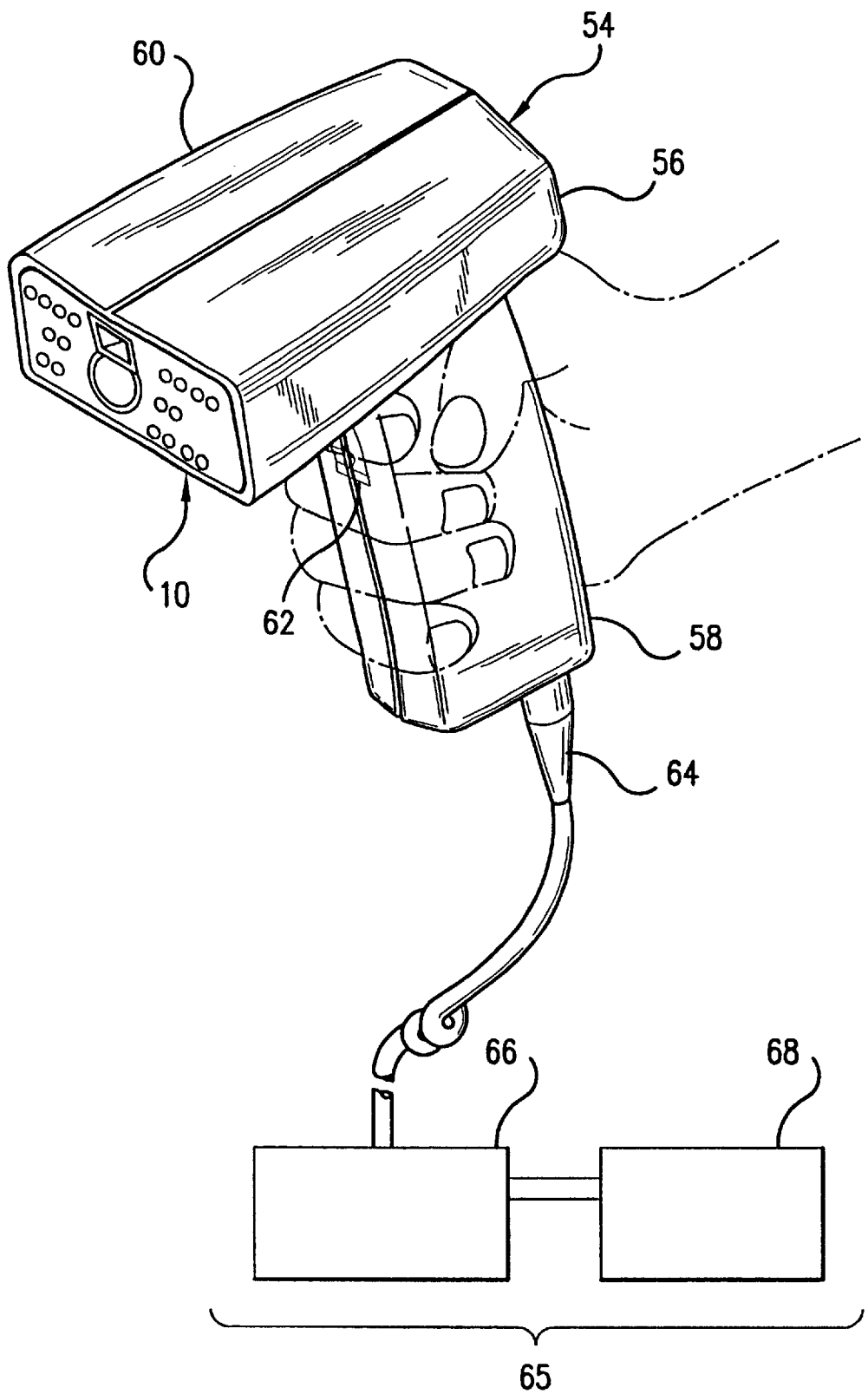
FIG. 4 is a pictorial view of a handheld optical code reader incorporating the imaging engine of FIG. 1, shown in one preferred use environment.

This point is further illustrated in connection with FIG. 4 which is a pictorial view of a handheld optical code reader incorporating the imaging engine of FIG. 1. The handheld code reader 54 of FIG. 4 includes a housing 56 having a generally elongated handle or hand grip 58 and an upper portion 60 for housing the imaging engine 10. The front face of the imaging engine appears at the forward end of the upper portion of the handheld optical code reader 54. The cross sectional dimensions and overall size of the handle portion 58 are such that the optical code reader can conveniently be held in the user's hand. The body and handle portions may be constructed of a lightweight resilient shock resistant self-supporting material such as a synthetic plastic material. The plastic housing may be ejection molded but can be vacuum formed or blow molded to form a thin hollow shell which bounds an interior space whose volume is sufficient to contain the imaging engine 10 and other components.

A manually actuatable trigger 62 is mounted in moving relationship on the handle portion 58 in a forward facing region of the optical code reader. The user's forefinger is normally used to actuate the optical code reader by depressing the trigger. A flexible electrical cable 64 may be provided to connect the optical code reader to components of the code reading system. In alternative embodiments the cable may also provide electrical power to the scanning engine 10. In preferred embodiments the cable 64 is connected to a host device or system 65 which receives decoded data from the optical code reader. In alternative embodiments a decode module 66 may be provided exterior to the optical code reading engine 10. In such an embodiment decoded data from the decode module 66 may be transmitted to further host device processing equipment and terminals represented generally by the box at numeral 68.

Figure 5:
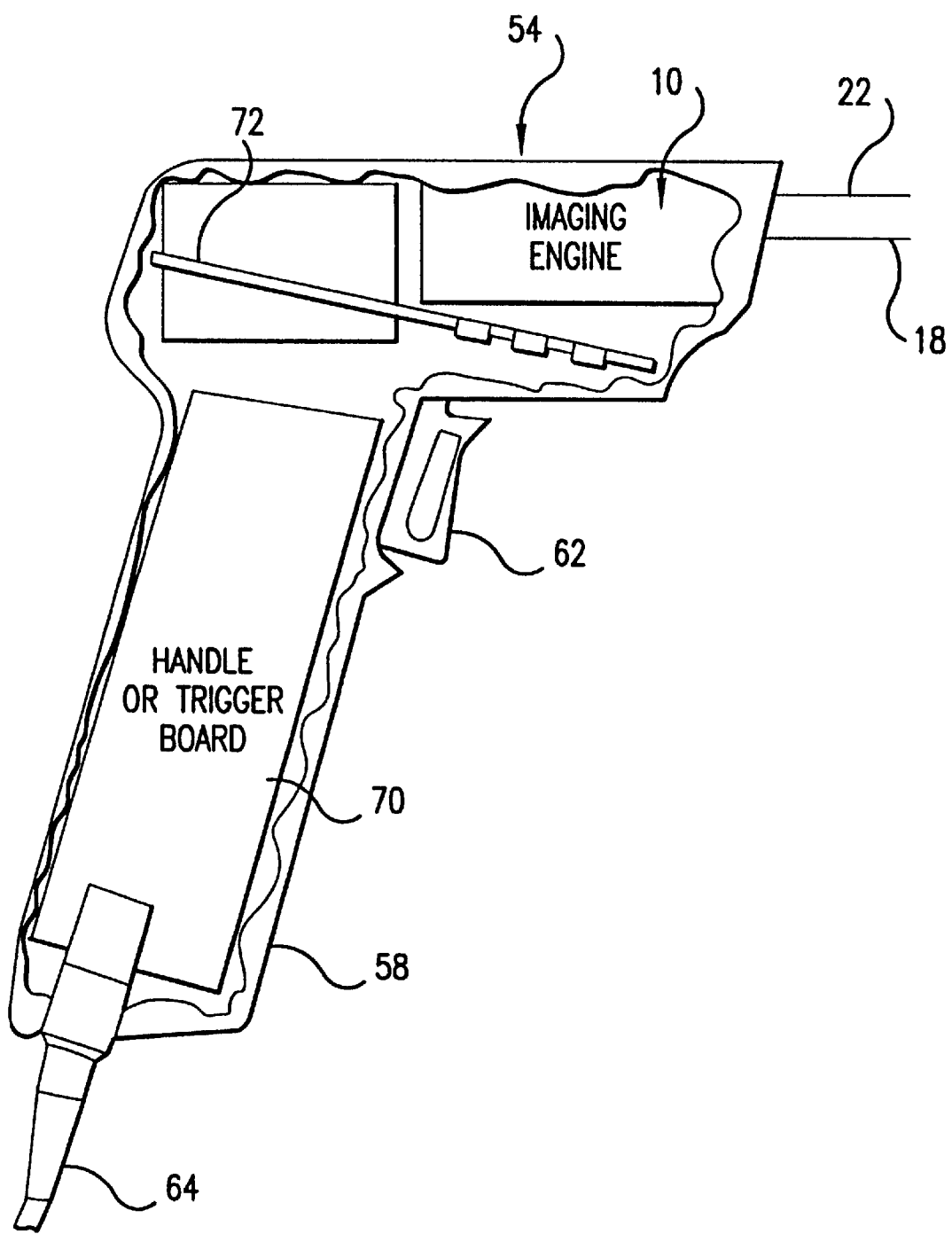
FIGS. 5 and 5a are a sectional views of preferred embodiments of a handheld optical code reader in accordance with the present invention showing the imaging engine and internal component placement.

FIG. 5 is a sectional view of a preferred embodiment of a handheld optical code reader in accordance with preferred embodiments of the present invention showing the location of the imaging engine 10. The parallel, offset relationship between the principal axis 18 of the objective lens assembly and the principal axis 28 of the aiming system is also shown.

A trigger or handle circuit board 70 is located in the handle portion 58 of the handheld optical code reader. The trigger board is electrically connected to switch means associated with the trigger 62 of the handheld device and processes signals indicative of the operator's depressing of the trigger 62 in order to initiate, or continue reading of optical codes.

In an alternative embodiment a decoding board 72 (including the microprocessor) may be provided external to the imaging engine 10. In circumstances where the handheld optical code reader of FIG. 5 is to be retrofitted from a laser line scan engine to an optical imaging engine, the imaging engine 10 and decoding board 72 may be inserted in place of the line scan engine and circuit board in the handheld code reader. In this way previously designed toolings, housings and host devices may be employed and provide continuity in upgrading the code reading system.

Figure 5A:
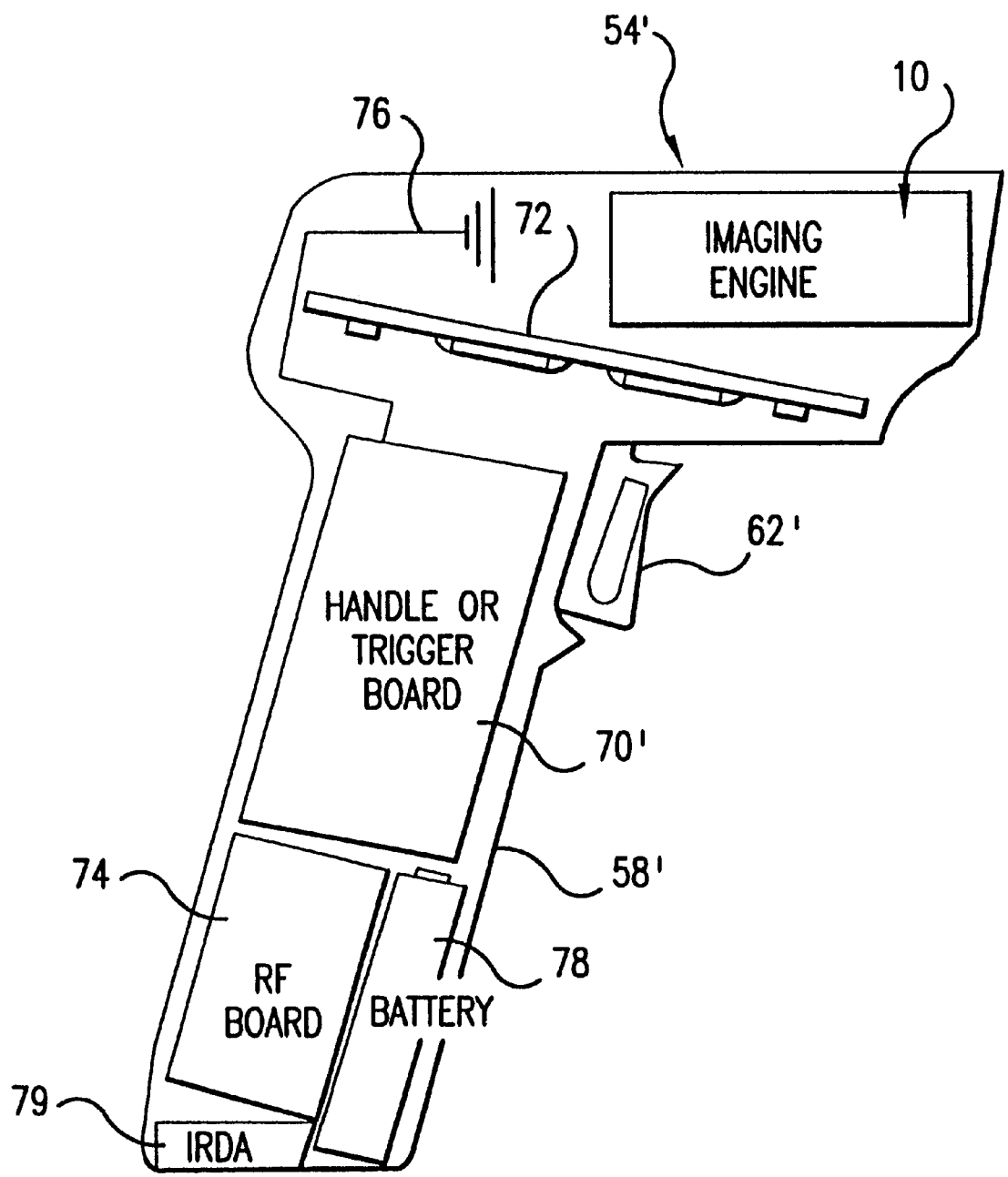

FIG. 5a is a sectional view of another preferred embodiment of a handheld optical code reader 54' in accordance with preferred embodiments of the present invention showing the location of the imaging engine 10. This embodiment is battery powered and wireless. A decoding board 72 (including the microprocessor) may be provided external to the imaging engine 10.

A trigger or handle circuit board 70' is located in the handle portion 58' of the handheld optical code reader. The trigger board is electrically connected to switch means associated with the trigger 62 of the handheld device and processes signals indicative of the operator's depressing of the trigger 62 in order to initiate, or continue reading of optical codes.

In addition to circuitry associated with the trigger, the handle of the optical code reader of FIG. 5a may contain a radio frequency board 74 and antenna 76 which provide a mobile radio link to one or more data terminals. Electrical power for the optical code reader 54' may be provided by battery 78. An infrared data interface (IRDA) 79 or multi-contact shoe (not shown) may also be provided to communicate data between the optical code reader and an external receiver or docking device, respectively.

Imaging engine electronic hardware includes two major electrical subsystems: an imaging subsystem and a decoding subsystem. The imaging subsystem includes an area CCD sensor, analog-to-digital converter, timing generator, automatic gain control (AGC) circuit and the peripheral circuits to control the above components. The decoding subsystem is constructed around a micro processor unit. In preferred embodiments the micro processor is an IBM manufactured PoweredPC (403 Series). The PowerPC is a 32 bit RISC embedded controller which provides high performance and functional integration with low power consumption. Other components of the decoding subsystem include a flash ROM, DRAM, I/O (8 bit bidirectional parallel port, 16 user/system single bit I/O's) and required glue logic.

Figure 6:
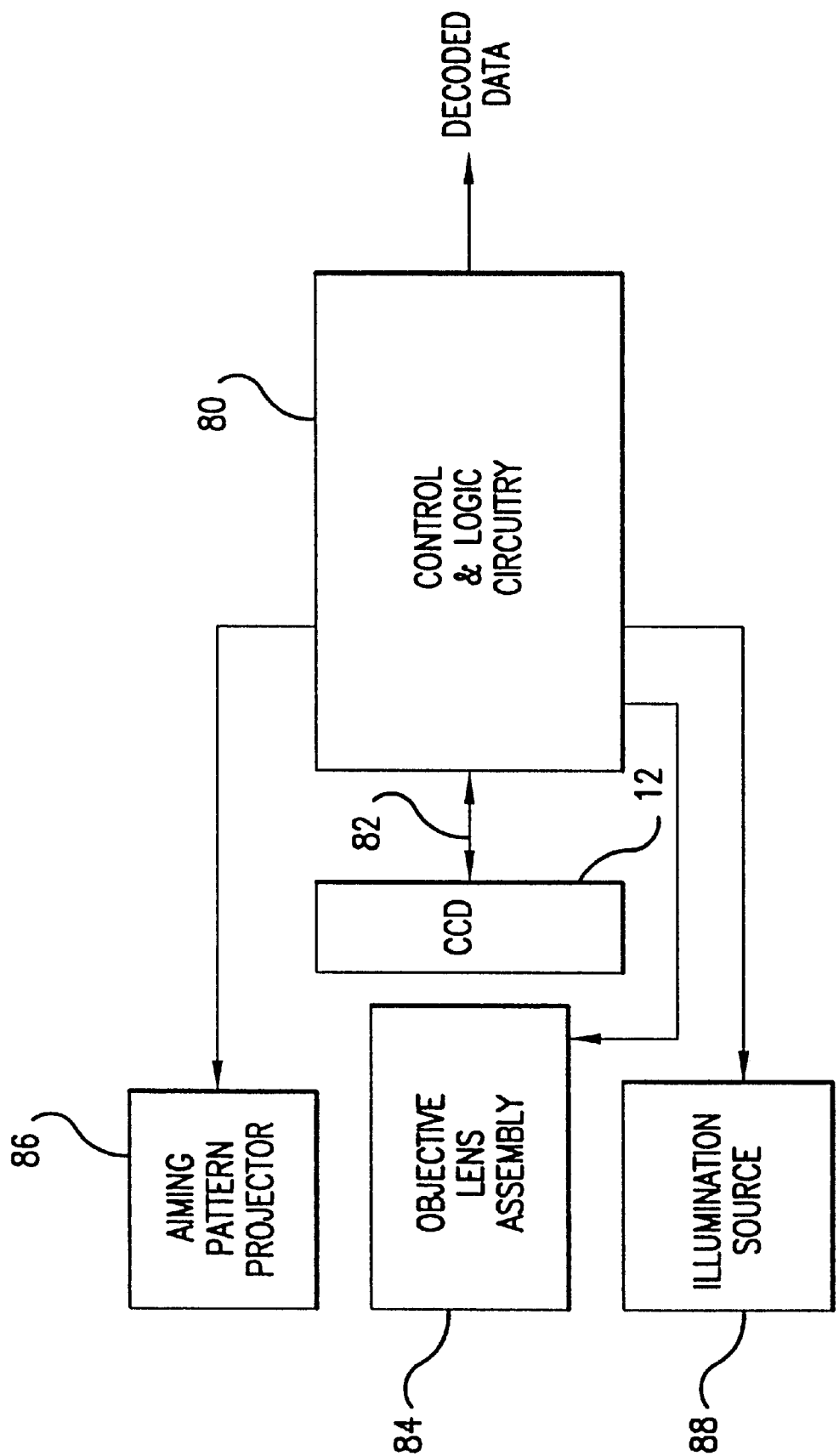
FIG. 6 is a simplified functional block diagram of a preferred embodiment of the imaging engine of the present invention.

FIG. 6 is a functional block diagram of a preferred embodiment of the imaging engine of the present invention illustrating the arrangement of certain electrical components of the imaging engine. The electronic hardware comprising the imaging subsystem and decoding subsystem is represented generally by a block 80, labeled "control and logic circuit" in FIG. 6. A double headed arrow 82 illustrates the conductance or transmission of signals between the image sensor 12 and the control and logic circuit 80. As shown in FIG. 6, the objective lens assembly 84, the aiming pattern generator 86 and the illumination source 88 may be controlled by signals provided by the control and logic circuitry 80. These interrelationships will be described in greater detail below.

II. Objective Lens Assemblies

FIG. 7 is a sectional view of an objective lens assembly 22 suitable for use in an imaging engine of preferred embodiments of the present invention including that described in connection with FIG. 1. The lens assembly 22 may include a barrel or housing 100 which contains two lens elements 102 and 104 and an aperture plate or spacer 106. The lens assembly of FIG. 7 is a symmetrical, two element design. The lens assembly is of small diameter. The lens elements 102 and 104 can be identical lens elements. Advantageously, the lens assembly has an aperture of less than 1/10" in diameter. The two lenses 102 and 104 may be concave-convex plastic lens elements with spherical surfaces and diameters of less than ½". The lens assembly is designed to be snap-fit together. As shown in FIG. 7, the lens 104 is aligned along an optical axis 18' of the lens assembly 22.

During manufacturing, the first lens 104 may be located against a concentric radial flange portion 108 of the barrel 100. The spacer 106 may be inserted followed by the second lens 102 arranged in back-to-back relationship with the first lens 104. A pressure-fit ring 110 may be used to retain the lenses and spacer in tight fitting relationship in the barrel 100. It will be understood that the spacer and lenses are pressed against each other and that only a small gap will be present between the components due to the concave shape of the lenses.

The lens assembly of FIG. 7 is intended to be manufactured as a unit and will not require manual focusing during the manufacturing process. A single spherical plastic lens element design may conveniently be used to mold both lens elements for the lens assembly of FIG. 7.

Individual components of the lens assembly of FIG. 7 will now be described in connection with FIGS. 8 and 9. FIGS. 8a and 8b, are, respectively, cross sectional and front views of an aperture plate or spacer used in the lens assembly of FIG. 7. As illustrated in 8b, the aperture plate has a dimension J which corresponds to the inside diameter of the barrel 100 of FIG. 7. In a preferred embodiment, this dimension is 5 mm.

The aperture plate 106 as shown in FIG. 8a has a thickness of a dimension K which, in preferred embodiments, is 0.10 mm±0.01 mm. A central aperture of diameter L is formed in the spacer 106 and has a dimension of 0.75 mm±0.025 mm. Using the components of the preferred embodiment described herein a lens assembly is produced with an F number of about 11.

A lens element 102 is depicted in cross sectional view in FIG. 9, it being understood that the other lens element 104 of FIG. 7 is essentially identical to this lens element. The lens element 102 has a spherical polished convex surface 112 and a spherical polished concave surface 114. In preferred embodiments of the present invention, the radius of curvature of these spherical surfaces is 8.86649 mm. The thickness of the lens element of FIG. 9 is indicated by the dimension M which in preferred embodiments may be 2.552 5 mm ±0.05 mm.

In preferred embodiments of the present invention, the number processing algorithms and optics of the imaging engine are jointly designed to yield optimum system performance. While prior art imaging devices for optical code readers have been designed using lenses originally designed for cameras to produce sharp in-focus images, this approach is not deemed necessary where appropriate steps are taken to provide proper signal processing for the imaging engine. Traditional "in focus" lens design techniques are not necessarily relevant to the problems presented by optical code reader design. The signal processing algorithms employed with the optical code reader of the present invention are designed to be tolerant of blurred images. The main optical design approach is to maximize working range of the system such that through the focus MTF (Modulation Transfer Function) at a spacial frequency is above some preset threshold. The net effect if a trading of focus and sharpness for depth of field. The result of these design considerations is a very small and inexpensive objective lens assembly.

FIG. 10 is a block diagram of a switchable lens assembly made in accordance with a preferred embodiment of the present invention. In the embodiment of FIG. 10 the lens assembly comprises a first lens 116 and a second lens 118 having a different field of view than the first lens. The lenses 116 and 118 may be manufactured in accordance with the techniques described in FIGS. 7 through 9 above, though the lenses 116 and 118 will have somewhat different optical properties in order to produce different fields of view and different focal distances to provide a larger total working range for the imaging engine than would be provided by a comparable single fixed lens.

Advantageously, the focal length of the lens 116 will be longer than that of the lens 118.

As shown in FIG. 10 the second lens 118 has an input optical axis 119 which directly impinges on the CCD 12. A folding mirror 120 and a moving mirror 122 are provided to divert the beam path 123 of the first lens 116 and to cause it to selectively or switchably impinge on the CCD 12. More particularly, the moving mirror 122 is designed to rotate about a pivot point 124 in response to signals processed by a servo control 126. The servo control 126 is under the control of control and logic circuitry indicated generally by the block 80. Alternatively, the moving mirror may be dropped, rotated, slid or otherwise moved into position by the servo control.

The lens 118 may be located as a part of lens assembly 22 in FIG. 1. The lens 116 may be located in the region identified by numeral 128 in the chassis 26 of the imaging engine of FIG. 1.

In operation, the control and logic circuitry may direct the lens assembly of FIG. 10 to rapidly switch between a relatively short focal distance and a relatively long focal distance and provide different fields of view for the optical code reader, permitting the unit to be used to read various sized codes located at different distances from the code reader. Alternatively, the reading of a special optical code could be used to toggle the imaging engine between different focal distance lenses. For example, the code reader may be used to read high density barcode having a minimum feature size of 4 mils at a 3" medium working distance. In such a case, the system may be designed to have a working depth of field of ±1½ to 2". Alternatively, the reader may read low density code, i.e. code having a 15 mil. minimum feature size as is typically used by UPS. In such a case, the median working distance may be as much as 15" with the depth of field of ±3".

III. Aiming System

FIG. 11 is a pictorial view of an aiming system of a preferred embodiment of the present invention. The Figure also shows a projected aiming pattern in a target plane. As shown in FIG. 11, an aiming system includes an aiming beam generator assembly 200 and a diffractive optical element 202. The aiming beam source 200 produces an aiming beam which travels of an aiming beam path 204 and is reflected by a fold mirror 206. From the fold mirror the aiming beam impinges on a diffractive optical element 202. In preferred embodiments of the present invention, multiple beamlets are produced by the diffractive optical element 202. In preferred embodiments, the beamlets diverge from the diffractive optic pattern and project spots through angular fields, preferably in front of the optical code reader. The aiming beam source 200 is, advantageously, mounted on the chassis of the imaging engine, for example, in the manner shown in FIG. 1. This mounting is facilitated by a bracket 208 integral with a cylindrical housing 210 which contains the aiming beam source.

The aiming beam source 200 is described in greater detail in connection with FIG. 12. As shown in FIG. 12, a laser diode 212 is mounted in the cylindrical housing 210. In preferred embodiments this laser diode is a 650 nanometer 5 milliwatt laser diode. The laser diode 212 projects a beam of light along an optical axis indicated by the numeral 36'. A beam of laser light from the laser diode 212 impinges on a high throughput, torroidal lens 214 and exits the laser diode beam source through an aperture cap 216. The diameter of the aperture formed in the center of the aperture cap is indicated by the letter N and in preferred embodiments is approximately 0.8 to 1 mm. In systems such as shown in FIG. 11, the diffractive optical element is located off the principal axis of the laser diode source. Alternatively, the diffractive optical element can be placed at a location indicated by the numeral 218 to provide an aiming pattern generator without a folded beam path. A preferred embodiment of the present invention involves projecting the aiming beamlets from the imaging engine along an axis parallel but slightly offset from the principal optical axis of the objective lens assembly of the imaging device.

The mechanical construction of the beam generator assembly will now be described in connection with FIG. 12. A compression spring 220 is nested in the barrel 210 and rests against an end wall of the barrel. A star washer 221 retains the spring. The torroidal lens 214 is inserted along with the aperture cap 216 and pressure-fit in place, the cylindrical coil compression spring acting to hold the components of the aiming beam source in position in the structure.

The aiming pattern generated by the system will now be described in connection with FIG. 11. In the system of FIG. 11 the laser beam from the beam generator is divided into diverging beamlets using binary optics or diffraction gradings which are conventional and well known in the art. The system is designed to generate collimated beams which diverge from the optical axis of the aiming system at an angle which approximately matches the expansion field of view of the objective lens assembly of the code reader at increasing distances from the imaging engine. Systems of these general type are disclosed in U.S. patent application Ser. No. 08/444,387 which is hereby incorporated by reference.

An aiming pattern particularly adapted for use in conjunction with preferred embodiments of the present invention is depicted in FIG. 11 as it would be projected on a hypothetical target plane 224. It should be understood that the target plane is an arbitrary plane selected to describe the arrangements and appearances of the aiming patterns and should be taken to correspond to any particular plane in which a target code of interest might lie within the working range of the imaging engine. The aiming pattern consists of one or more aiming frames and a central marker such as the cross hairs shown at 222. The pattern shown in FIG. 11 contains two aiming frames: a wide angle aiming frame 226 and a narrow angle aiming frame 228. Both aiming frames share the same central marker 222. The aiming frame 226, in preferred embodiments, corresponds to a solid angular field 230 of approximately 36° by 27°. The smaller aiming frame 228 corresponds to a narrow or solid angular field, for example, about 10°×7.5°. It will be understood that the smaller angular field is particularly usable for aiming the imaging engine at more distant optical codes and target planes.

As shown in FIG. 11, the beamlets emanating from the diffractive optical element 202 projects spots in the direction of the target plane. These spots are arrayed in a particular pattern suitable for providing useful aiming frames to assist the operator in pointing a handheld optical code reader at a target code. The aiming frame 226 consists of four corner markers 232. Each of these corner markers itself consists of two intersecting continuous lines or lines of spots. The lines intersect at a 90° angle forming corners of a frame which corresponds generally to the angular field of view of the lens assembly of the system set to a particular focal length or working distance. Where spots are employed, the spots which form the corners 232 are four in each line, each line sharing the corner-most dot. Similar patterns are provided for the aiming frame 228 consisting of 12 spots each. Finally, the center marker 222 consists of two intersecting continuous lines or lines of spots, the lines intersecting at a 90° angle. As shown in the Figure, where spots are employed, the center marker of this particular pattern has lines of spots which are 7 in number, each line sharing the center spot.

Diffractive optics aiming creates a bright, crisp aiming pattern. In accordance with teachings of the present invention, the aiming patterns projected by the aiming system are representative of the image engine's field(s) of view and as such provides feedback to the user regarding image framing and centering as well as the imaging pitch, roll and skew with respect to targets for bar coding an image capture. For example, if the target is a cylindrical surface carrying a barcode, the rectilinearity of the frame will be distorted in appearance on the target. Image processing may be used to extract information concerning the shape and location of the surface on which the optical code lies.

The aiming pattern here disclosed is intuitive to use and is similar to the view finder of most cameras. The use of nested aiming frames is particularly advantageous in systems having selectable fields of view to identify the two or more possible fields of view and to select two or more possible fields of illumination, described in greater detail below. In preferred embodiments, both a near and a far aiming frame are projected simultaneously. The aiming pattern may be pulsed on and off, for example, 20 times per second.

The disclosed aiming patterns are particularly appropriate for targeting a selected subset of a single field of view. Conventional imaging readers suffer from the weakness that they do not always decode the symbol at which they are pointed. This is often caused by the fact that the aiming and imaging systems are independent and open loop. Any parallax (misalignment) between the two systems causes the decoding algorithm to act upon a point which is different than that where the user is pointing the aiming pattern. In accordance with a preferred embodiment of the present invention, two images are captured in rapid succession, first an image containing the aiming frame projected on the target and a second image of the target with the aiming pattern switched off. Data from the first image is input to circuitry/software which operates to locate the center marker or cross hairs in the image to provide feedback to a decoding algorithm to identify where the user is pointing. In addition, this first image can be used to select the illumination and exposure levels for the second target picture.

The fact that the aiming and imaging systems such as those disclosed above do not share a common optical axis, but rather have parallel axes and offset by a known distance, means that at different object distances the cross hairs or center markers are located at different points or pixel coordinates in the image. An image captured containing the aiming pattern can be used to determine the position of the center marker or cross hairs with respect to the geographic center of the image on the CCD. In a preferred embodiment, a band pass optical filter may be selectively placed in the optical path of the image sensor to selectively pass light having the wavelength of the aiming pattern, so that the position of the aiming pattern can be detected, even under conditions of high ambient light or sunlight.

Figure 12A:
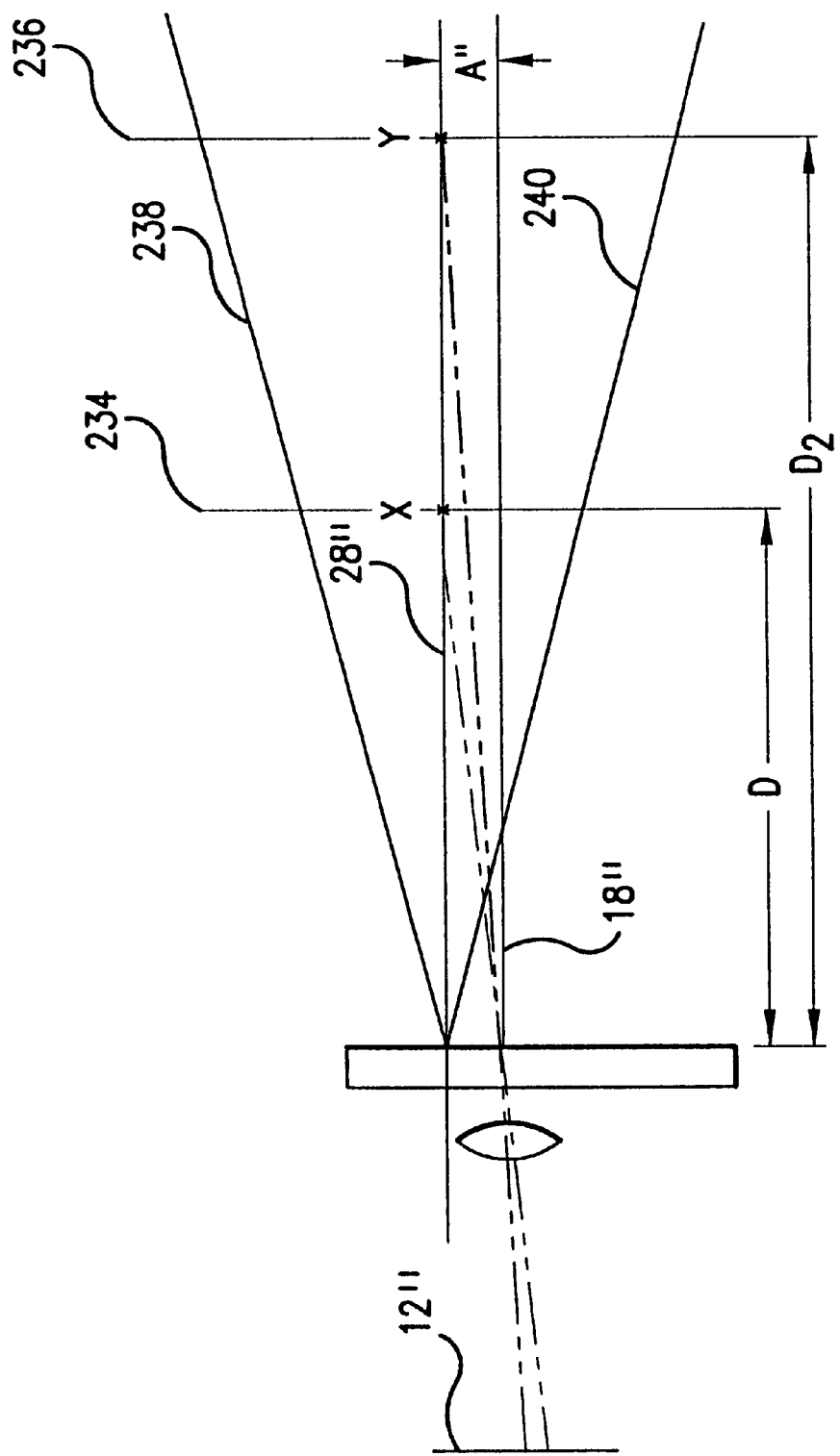

Once an image of the aiming pattern is captured, the unit may be calibrated and the offset of the image of the center marker can then be used to estimate the distance between the optical code reader and the target. This procedure is illustrated with reference to FIG. 12(a). In the figure, the principal axis 18" of the objective lens and the principal output axis of the aiming system 28" are parallel and offset by a small distance A". A ray which tracks the beamlet which defines the center marker of the aiming frame is collinear with the axis 28". Diverging framing beamlets are indicated at 238 and 240. The locations of the center marker in a first target plane 234 and a second target plane 236 are indicated at points X and Y, respectively. The images of points X and Y on the surface of an area image sensor 12" are x and y, respectively. It will be observed that points x and y are offset slightly from one another. This offset can be correlated with the distances $D_1$ and $D_2$ of the target planes 234 and 236, respectively. Once the system is calibrated, information concerning the offset of the image of the central marker viewed at an arbitrary distance may be used to estimate the distance between the code reader and the target from which the center marker is reflected.

In the systems of the present invention, the aiming objects are provided as a guide to assist the user in aiming the scanner. The precise orientation of the aiming pattern does not affect the operational performance of the system once the system is calibrated. Accordingly, precision aiming objects are not required. It is this factor which permits the use of snap-together optical elements such as disclosed in FIGS. 1–7, 11 and 12. In such systems, no manual adjustments are required. The elimination of this need for adjustment results in lower manufacturing costs.

IV. Illumination System

FIG. 13 is a partially exploded pictorial view of the front face of an imaging engine of a preferred embodiment of the present invention. The illumination system may consist of an illumination printed circuit board 48 and a lenslet plate 50. The illumination printed circuit board 48 may include a plurality of light emitting diodes 300. In a preferred embodiment of the present invention twenty 660 nm laser diodes are arranged on the illuminator board 48. In an alternative embodiment, 20 laser diodes producing 590 nanometer wavelength light are employed. The latter diodes have a peak luminous intensity of 6.5 lumina per steradian with a total field angle of 8°. In either case, the laser diodes are arranged in such a way that the target area is evenly illuminated. In systems where multiple fields of view and multiple focal lengths are selectable in the imaging engine, the illumination system may provide different fields of illumination as will be described in connection with FIGS. 15 and 16.

Light emanating from the light emitting diodes 300 is projected through apertures or lenslets 302 in the front plate 50 of the imaging engine. The arrangement of the light emitting diodes and corresponding holes or lenslets in the plate is best illustrated with reference to FIG. 14. In FIG. 14 the smaller diameter circles represent the illumination areas of the illumination source and correspond roughly to the positioning of the diodes 300 and the positioning of the holes or lenslets 302 of the apparatus shown in FIG. 13. The smaller holes 304 are holes for mounting screws. A large central aperture 306 receives the optical baffle 20.

Multiple illumination fields are illustrated in FIG. 15 and 16. Referring first to FIG. 15, an illumination source in accordance with the preferred embodiment of the present invention is shown projecting a short range, wide illumination pattern (low beam). The low beam pattern shown in FIG. 15 is produced by light emitting diode sources at 308 which are located relatively near to the principal axis 18" of the imager lens assembly. In a preferred embodiment, sources 308 are used without lenslets. As shown in FIG. 15, light projected from sources 308 intersects at the optical axis 18" and provides a relatively uniform illumination coverage at a relatively short distance, for ample, 3" from the face of the optical code reader. FIG. 16 illustrates a high beam mode of operation employing the illumination system of FIG. 13. In this configuration the remaining 18 laser diodes are employed to illuminate the field. The illumination field shown in FIG. 16 is more narrow but still centered about the principal optical axis 18" of the objective lens assembly. It will be understood that various configurations of field of illumination may be obtained with combinations of various types of laser or light emitting diodes of different intensity or different illumination pattern divergence. Additionally or alternatively, various lenses or lenslets can be used in conjunction with the multiple light emitting diodes in order to produce the desired multiple fields of illumination and to achieve the requisite degree of uniformity in those illumination fields. Further, alternatively, one or more laser diode arrays may be employed to provide a compact illumination system. Multimode laser diodes may be used to cancel speckle noise in the illumination pattern.

A practical problem with imager illumination systems for handheld optical code readers is that at close ranges a large angular field of view is required to cover a target code. At further distances, the required angular field of view is smaller. Any illumination system must cover the whole system at close ranges, but this can result in much of the illumination light being wasted at far distances. The above described embodiments of the illumination system use a low broad beam at close distances. At higher distances, a narrower higher beam can be switched on. Though the higher beam produces a somewhat uneven illumination pattern, this illumination pattern can be accommodated by image processing algorithms which will compensate for known variations in illumination from the diode sources. Such compensation is facilitated by knowledge of the distance of the target barcode. As discussed above, this distance can be determined in conjunction with the aiming pattern system already described.

V. Electrical Arrangement-System Control Data Flow And Power Supply

FIGS. 17, 18 and 19 are block diagrams of various electric circuits and circuit boards employed in preferred embodiments of the present invention. FIG. 17 is a block diagram of a CCD circuit board. As shown in FIG. 17, electronic signals from a CCD detector 400 pass through various signal conditioning blocks to produce a digital output signal 402 applied to a logic board or circuit of the system. The CCD detector is provided with power supply board or system (FIG. 19) and clock driver signals by the clock driver circuit 404. Various sync pulses and control signals are applied to a clock generator 406 from an FPGA on the logic board (FIG. 18).

FIG. 18 is a block diagram of a logic circuit board employed in a preferred embodiment of the present invention. The heart of the logic board is a micro processor 410. Digital signals from the imaging sensor circuits are supplied to the microprocessor by FPGA circuit 411. As indicated by the data line 412, the FPGA provides control signals from the microprocessor for the aiming system, illumination system and objective lens servo system. The microprocessor also provides information to systems external to the imaging engine via the RS 232 driver 414. In one embodiment video images may also be transmitted, especially to the serial port of PC or terminal to permit display or recording of the image incident on the imaging sensor.

The micro-processor may also communicate by data line to Flash memory 416 and DRAM memory 418 on which data and software for the system are stored. This information may include decoded data from a target optical code.

FIG. 19 is a block diagram of a power supply system for an imaging engine of a preferred embodiment of the present invention. Fifteen volts and −7.5 volt power supply elements are shown at 430 and 432, respectively. These provide electrical power to the CCD board as shown. A +5 volt power supply line is also connected to the CCD board, logic board, aiming laser control 434 and LED illumination control circuit 436. Control lines from the logic board for each of these circuits are indicated at 438 and 440.

VI. Signal Processing and Decoding

FIG. 20 is a combined flow chart and system block diagram illustrating the processing and decoding of CCD data in a preferred embodiment of the present invention. CCD data obtained by the image sensor circuitry is indicated at 500. This data may be in the form of electronic signals corresponding to a two-dimensional array of pixel information for a target image. The data may be stored for subsequent processing in the DRAM of the optical code reader. It will be understood that the processing software which implements the processes of FIGS. 20 to 23 may have access to the stored image data at all levels. At various processing steps, portions of the pixel data may be called up for further processing or to confirm on-going analyses.

The pixel data may be divided into subimages, for example, 32×32 pixel subimages. These subimages are analyzed for properties known to be associated with various types of optical codes and known to distinguish a particular code from other codes and environmental (non-code) images. More particularly, a process of statistical Autodiscrimination may be employed. In statistical Autodiscrimination the image is divided into sub-images or sections and some statistic computed for each section. Subimages with similar statistics can be grouped to form regions of interest or clusters which may contain codes. The advantage of the statistical approach is that once the statistics are compiled, only the sub-images need to be processed, significantly reducing the computation requirements. In addition, the compilation of the statistics is simple and can be done in hardware for super fast systems. The statistic used in preferred embodiments is a histogram of local surface orientations. The statistics can be obtained by analyzing surface tangents to cluster the subimages. Once a cluster is identified, the image data may be further analyzed to detect the presence of tangents associated with particular types of optical codes. Statistical Autodiscrimination is a subject of a U.S. Patent Application entitled "AUTODISCRIMINATION AND LINE DRAWING TECHNIQUES FOR CODE READERS" to Duanfeng He, Eugene Joseph and Joseph Cai and filed on the same day as this application and assigned to Symbol Technologies, Inc., which application is hereby incorporated by reference. Alternatively, a neural network can be used to discriminate image areas of possible interest as containing optical code. A neural network can also be designed to look directly at the input image. The location of the aiming pattern with respect to the subimages may also be used as an indicia or weighting factor in selecting subimages for further processing.

Figure 22:
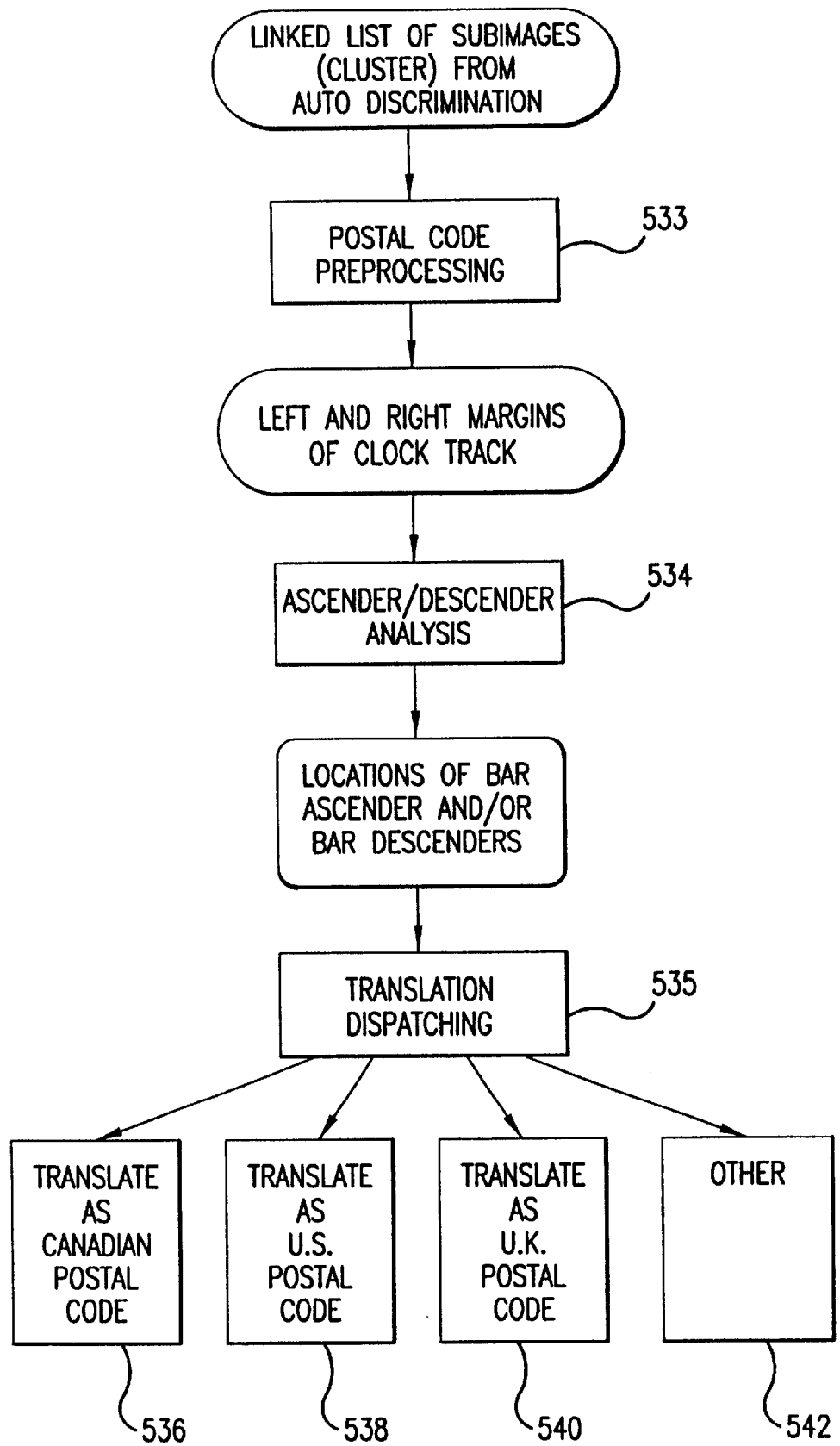
Figure 23:
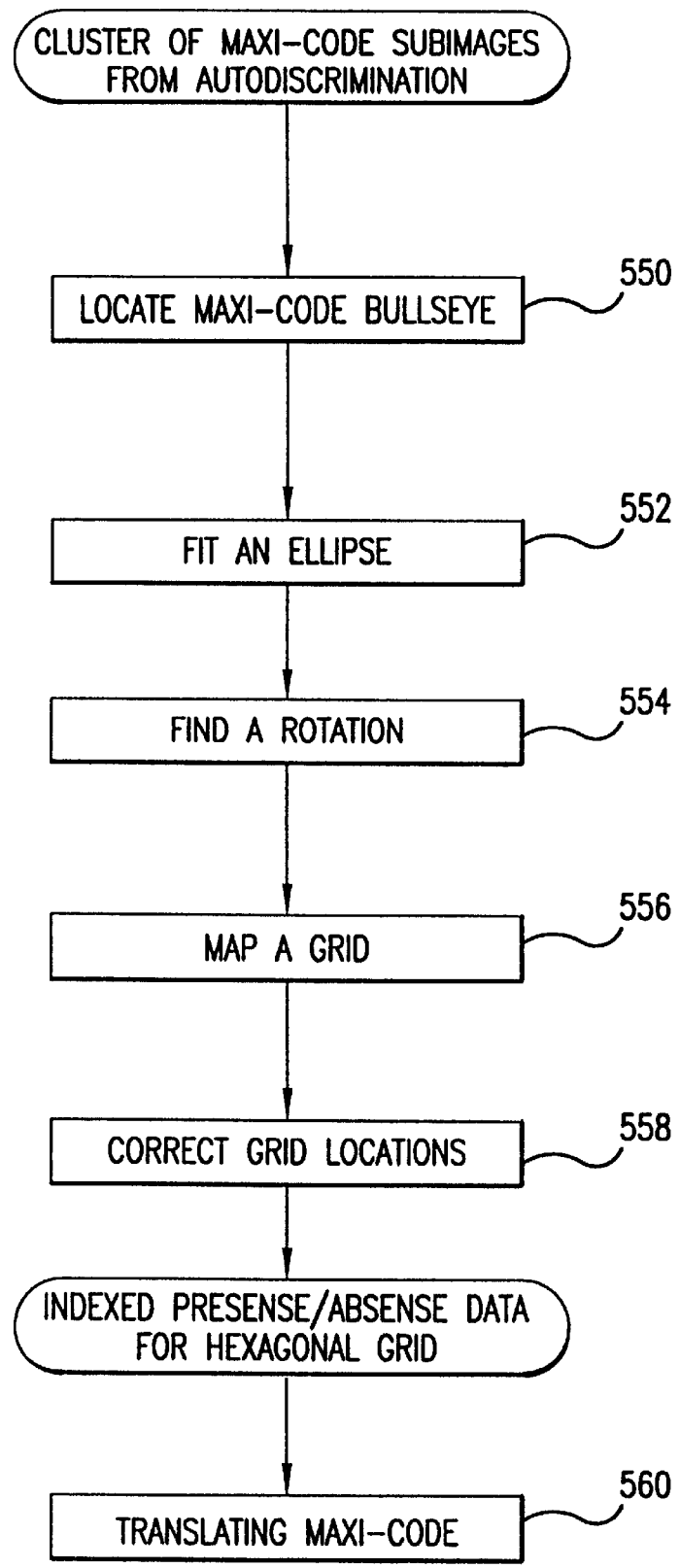

In preferred embodiments, an Autodiscrimination software executed by the system microprocessor determines which subimages clusters contain codes of a particular type and the coordinates in the pixel data array of certain boundaries or features of preliminarily identified code areas. This system is indicated at 504. As shown in FIG. 20, the image data may be preliminarily designated as a one dimensional code, two dimensional code, Postal Code or MaxiCode, it being understood that other code types with recognizable statistical patterns could be identified at this stage of processing. The remainder of FIG. 20 illustrates a processing scheme for a one dimensional code. Processing schemes for the other types of code are illustrated in FIGS. 21 through 23.

The Autodiscrimination function 504 provides the coordinates of ends or boundaries of subimages designated as being a one dimensional barcode. More specifically, the Autodiscrimination function may provide cluster and orientation information by providing the coordinates of the corner points defining a parallelogram of pixel information identified as containing a one dimensional barcode. Further processing indicated at 506 produces a digitized version of the code. More particularly, the function at 508 extracts one or more waveforms from the data in image areas of interest. This processing involves analysis of pixels near lines selected by the system (line drawing). This process is described in detail in the above mentioned Duanfeng He, Eugene Joseph and Joseph Cai U.S. patent application. The result of this process is a continuous waveform 509 produced from pixel grey scale information in a relatively "wide" line or swath of pixels drawn across the one dimensional code along its principal axis as determined preliminarily by the Autodiscrimination function 504. Peaks and valleys in the waveforms are identified as indicated at 510. Digitizing converts this information to electronic signals corresponding to the data or bit content of the image as indicated at 512. Digitizer processing is described in a U.S. Patent Application entitled DIGITIZING BAR CODE SYMBOL DATA" to Duanfeng He and Eugene Joseph, filed on Jun. 12, 1998 and assigned to Symbol Technologies, Inc., which application is hereby incorporated by reference. The digitized output is then translated at 514 to provide a translated data output. The signal line at 516, indicates the possibility of calling for the extraction of data from a different line drawn across the same one dimensional data. A failure to decode any line drawn may be used to trigger additional auto discrimination in a further attempt to identify and locate a target code as indicated by line 518.

The image processing circuitry/software may be employed to analyze a portion of the projected aiming pattern in the pixel information produced by the image sensor. This information may be used to provide feedback to the processing circuitry to help identify an image area in which a target barcode is located. Such image processing may also be used for determining the distance between the reader and the target barcode. This information, in turn, may be used to select an illumination level for a subsequent image to be decoded, and to control the illumination source. Alternatively, the information may be used to select a focal distance for a subsequent image to be decoded and to control the lens assembly associated with the image sensor to switch different objective lenses into the input optical path of the image sensor.

Figure 21:
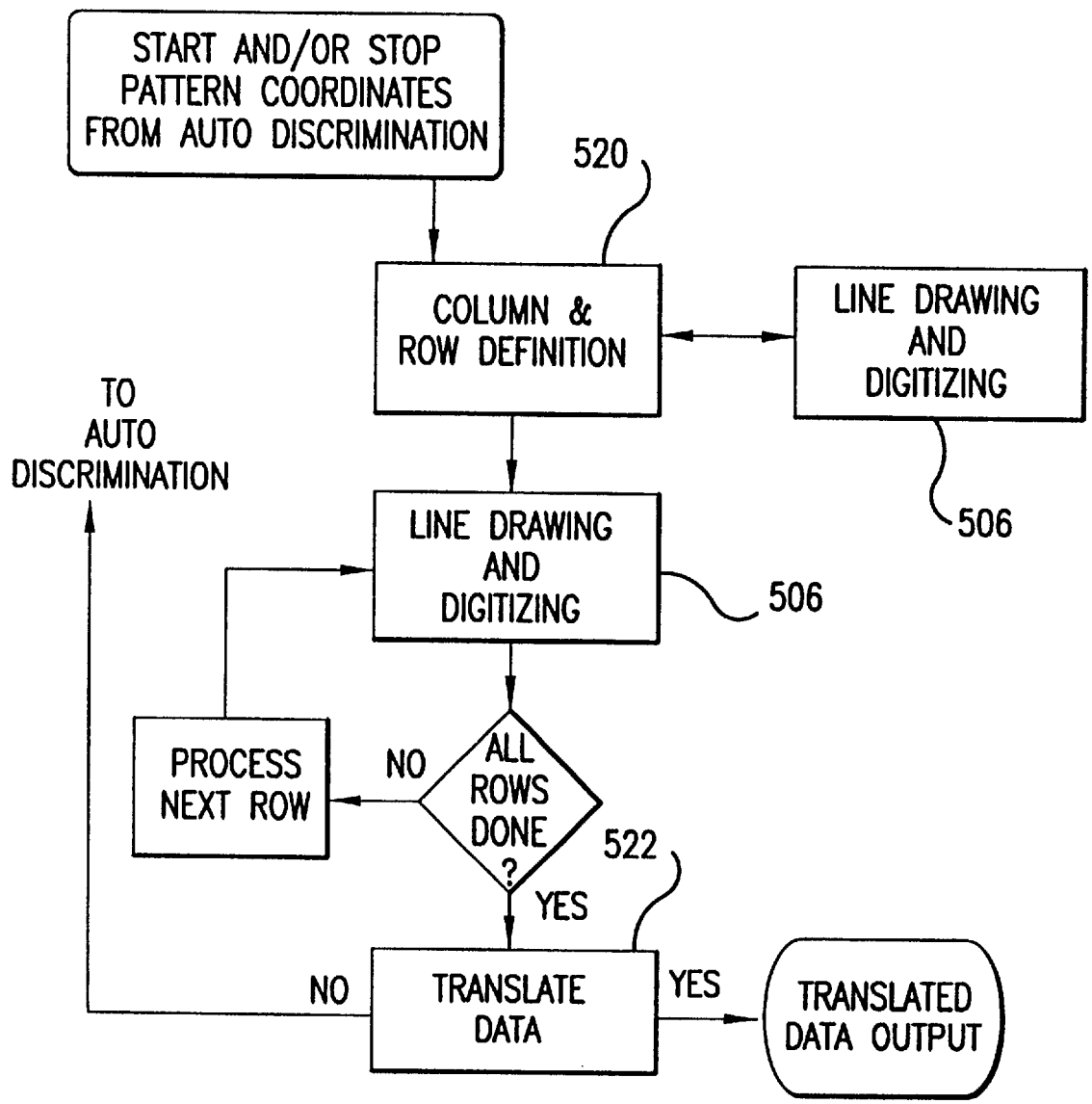
Figure 21A:
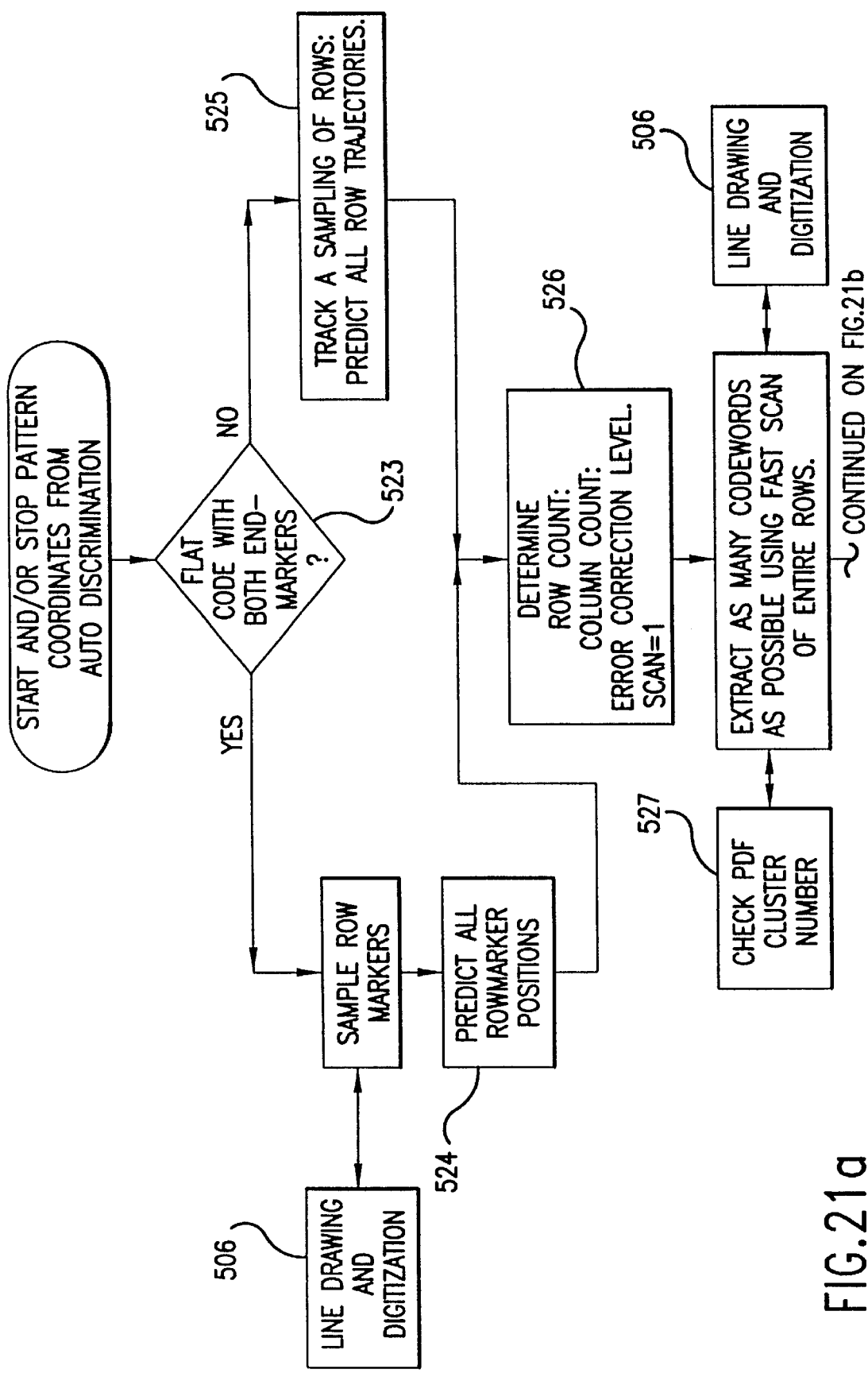
Figure 21B:
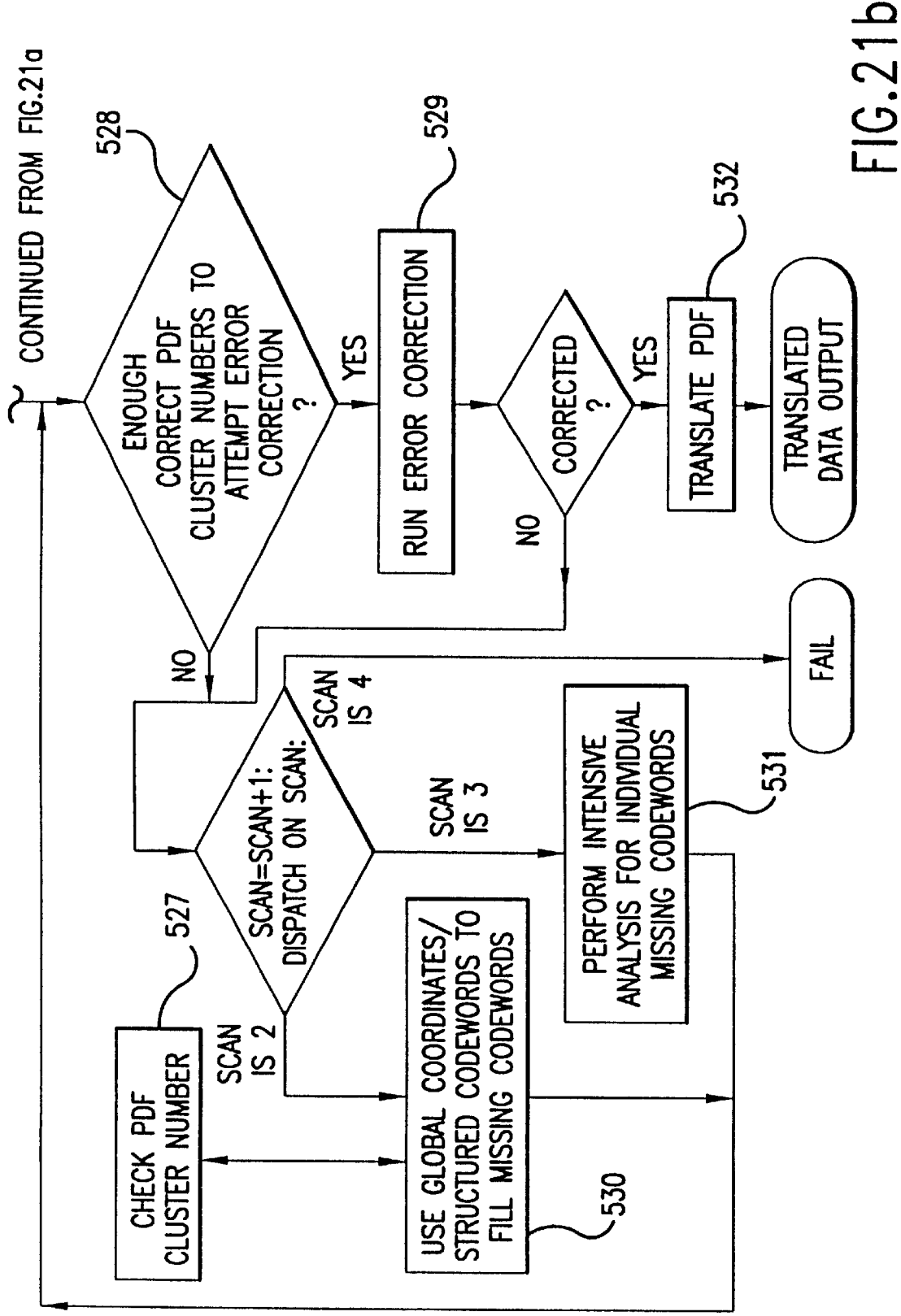

FIG. 21 is a simplified flow chart illustrating the processing and decoding of two-dimensional pixel data identified by the Autodiscrimination function 504 as being two dimensional code such as PDF. Column and row definition is performed at 520. In the course of this processing, the wide line drawing and digitization processing identified at 506 in FIG. 20 may be called up to process portions of the pixel data from the DRAM. Once the column and rows of the code are defined, data may be sequentially extracted from the full length of the code rows by the processing algorithms of block 506. When data has been extracted from the rows of interest, translation may be attempted as indicated at block 522. If translation is unsuccessful, process control may be returned to the Autodiscrimination function to select another code type and/or cluster of subimage pixels for analysis.

FIG. 21(*a*) is a more detailed flow chart illustrating a preferred technique for processing and decoding PDF Code. Generally speaking, the illustrated processing applies successively more computationally intensive processing as difficulty in decoding degraded images is encountered. As before data indicative of a cluster of subimages potentially containing PDF Code are provided by the Autodiscrimination function. This data may be start and/or stop pattern coordinates. At 523, a determination is made as to whether the subimage cluster is a flat code with both end markers. If it is, the PDF Code row markers are sampled, during which the processing calls the line drawing and digitization subroutine 506, discussed above. From this all row marker positions are predicted at 524.

If the code is not flat or lacks one or both end markers, a sampling of rows is tracked and row trajectories are predicted as indicated at 525. Conventional PDF decoding techniques trace straight lines across the rows in a PDF symbol. When the PDF image is distorted (tiled and/or twisted), a single straight line may cross too many rows to allow decoding. Accordingly, the processing of a preferred embodiment breaks this single line into local line segments which then enables independent decoding of code words. The entire PDF image may be examined to determine whether and to what extent this technique will be employed.

Processing converges at 526 from functions 524 and 525 in the determination of row count, column count and error correction level information embedded in the PDF row markers. The error correction level data may be used later to determine whether to run error correction and what type of error correction to attempt.

The line drawing and digitization subroutine 506 may again be used to extract as many code words as possible using fast scans of entire rows. PDF cluster numbers may be checked by calling the subroutine 527. If enough correct PDF cluster numbers are identified at 528, a determination may be made to perform error correction processing 529.

If not enough correct PDF cluster numbers are identified, the processing is incremented to scan=2. At scan=2, global coordinates and structured code words are used to fill missing code words. In conventional PDF decoding, decoders attempt to decode code words one by one in a scan line. If the decode effort fails in a code word, it may be difficult to resume decoding the next code word because of uncertainty of the location of the boundary of the next word. This problem when encountered could be obviated by decoding in a reverse direction along the row from a region of high confidence (e.g. a start/stop pattern). Alternatively, as indicated at 530 known positions of adjacent rows and code words can be used to predict the start of code words in a damaged row. The decoding can be verified by a call to check the PDF cluster numbers obtained.

If, after scan=2, the processing has still not identified enough correct PDF cluster numbers, the processing is incremented to scan=3. At scan=3, intensive analysis is performed to decode individual missing code words at 531. In preferred embodiments, good code words are mapped. As to areas containing bad code words, more complex two dimensional processing is applied in an attempt to extract the missing code words. If after this, not enough correct PDF cluster numbers are obtained, the scan marker is incremented to 4, indicating a decoding failure. In response to a decoding failure, process control may be returned to the Autodiscrimination function 504 to redetermine code type or start/stop pattern coordinates. Alternatively, more processing time may be allocated to the decoding functions of FIG. 21(*a*). Further, alternatively, new image data may be acquired and processed by the Autodiscrimination function.

If error correction is successful, corrected data may be translated at 532.

FIG. 22 is a flow chart illustrating the processing and decoding of two dimensional pixel data identified by the Autodiscrimination function as being Postal Code.

A cluster of Postal Code subimages from the Autodiscrimination function is preprocessed at 533, to determine the presence of and the left and right margins of a Postal Code clock track. The end points of a line crossing the postal code clock track from the first to the last bar are the output of the postal code preprocessor. In preprocessing the code is assumed to be oriented along a line of subimages with the strongest correlation or similarity. Left and right subimages are searched to identify left and right bars (not necessarily the first and last bars of the code). The processing then attempts to identify bar regularity indicative of a clock track between the identified left and right bars. The high aspect ratio of the clock track makes it difficult to find the first and last bars of the clock track on the first try. Therefore, the preprocessing proceeds iteratively until the first and last bars of the clock track have been identified, by realigning the initial estimate of the clock track.

Once the left and right margins of the clock track have been located, the data is further analyzed by a line-walking algorithm at 534 to determine the location of bar ascenders and/or bar decenders. Based on this information a decoder dispatcher 535 makes tentative determinations as to the type of Postal Code involved. The ascender/descender location data is passed to an appropriate translation function 536 through 542 and translation is attempted. If translation is unsuccessful, process control may be returned to the decoder dispatcher to select another Postal Code type, or returned to the Autodiscrimination function 504 to select another code type and/or cluster of subpixels for analysis.

FIG. 23 is a flow chart illustrating the processing and decoding of two dimensional pixel data identified by the Autodiscrimination function 504 as not being one of the other types of code previously discussed and having a contrast variation within predetermined limits. In this processing, cluster data may be accepted line by line. The system first attempts to locate a MaxiCode bullseye at 550 by analyzing the pixel data in non-parallel run directions for patterns indicative of concentric rings. An ellipse is then fitted to the inside edge of the outermost black ring at 552. The rotation of the grid is determined from the location of the 18 orientation hexagons in the image as indicated at 554. A bilinear transformation is calculated to account for tilt of the target code and to map a grid, at processing step 556. Grid locations are corrected progressively outwardly by shifting hex centers to better fit the pixel data, as indicated at block 558. The result of this processing is indexed presence/absence data for the hexagonal MaxiCode grid. This data is passed to the MaxiCode translating function at 560. If the MaxiCode decoding or translating fails during the processing of FIG. 23, process control may be returned to the Autodiscrimination function 504 to select another code type and/or cluster of subimage pixels for analysis.

Thus, through the use of the processing techniques exemplified in FIGS. 20 through 23, translated data may be obtained from signals corresponding to a two-dimensional array of pixel information from a field of view of the imaging engine.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. An imaging and aiming apparatus for an optical code reader comprising:
   an image sensor, including an array of photo sensor cells for producing electronic signals corresponding to a two-dimensional array of pixel information for a target image;
   a lens assembly for focusing light incident on the reader from at least two different fields of view, corresponding to at least two different focal distances;
   means for controlling the lens assembly to select a field of view; and
   an aiming pattern projector for projecting at least two different aiming frames, each indicating a field of view of the lens assembly.

2. The apparatus of claim 1, further comprising power supply, decoding circuitry and video controller circuitry and wherein the apparatus is less than 2 cubic inches in volume and is dimensioned to replace a moving laser beam scanning engine in a handheld barcode scanner.

3. The apparatus of claim 2, wherein the apparatus can read both high and low density barcodes, and has a total working range of between 1½ and 18 inches.

4. The apparatus of claim 1, wherein the aiming frames have different, partially overlapping angular dimensions corresponding to the different fields of view of the lens assembly and wherein the aiming pattern includes a centrally located marker.

5. The apparatus of claim 4, wherein each aiming frame consists of four corner markers each comprising a plurality of illuminated spots.

6. The apparatus of claim 5, wherein the aiming pattern projector comprises at least one laser and at least one diffractive optical element.

7. The apparatus of claim 4, wherein the principal optical axes of said aiming pattern projector and the lens assembly are offset from one another, but by no more than 1", and wherein the image sensor obtains an image of at least a portion of the aiming pattern.

8. The apparatus of claim 7, further comprising means for obtaining pixel information of a target field of view both with and without an image of the centrally located marker and means for determining the distance of a target code based on the apparent location of the centrally located marker in the field of view.

9. The apparatus of claim 8, wherein the aiming pattern projector is periodically turned off during which time pixel information of the target field is obtained without an image of the centrally located marker.

10. The apparatus of claim 1, further comprising frame grabbing circuitry for providing video signals for displaying images produced by the apparatus on a terminal monitor.

11. The apparatus of claim 10, further comprising means for selectively turning off the aiming pattern projector when the apparatus is used to obtain pixel information for image display.

12. The apparatus of claim 11, wherein the means for selectively turning off the aiming pattern projector is an electrical switch.

13. The apparatus of claim 12, wherein the moving optical element is a moving mirror which folds the optical path of at least one of the lens.

14. The apparatus of claim 13, wherein the means for controlling the lens assembly is an electronic servo for flipping the mirror.

15. The apparatus of claim 1, wherein the lens assembly comprises a first lens, a second lens having a different field of view than the first lens, and a moving optical element for selectively providing an image to the image sensor through one of the first or the second lens.

16. The apparatus of claim 1, further comprising an illumination source for illuminating a target of the optical code reader, the illumination source having at least a first and a second illumination fields corresponding to first and second fields of view of the lens assembly, respectively.

17. The apparatus of claim 1, wherein the lens assembly has an aperture less than $1/10$" in diameter and includes two lenses, each having two concave-convex plastic lens elements with spherical convex surfaces and diameters less than ½"; and
   snap fitting means for aligning the lens elements along a common optical axis in back-to-back relationship.

18. An imaging engine for a handheld optical code reader for reading optical codes located at various distances from the imaging engine comprising:
   a solid state device for producing a signal corresponding to a two-dimensional image,
   a solid state device lens assembly having a principal input optical axis for focusing light on the solid state device, said lens assembly being switchable between at least two different focal distances;
   an optical element for projecting an aiming pattern in a field of view of the solid state device lens assembly, the pattern having an angular dimension related to the size of the fields of view of the solid state device lens assembly at the at least two different focal distances;
   an illumination source which is switchable to provide a first illumination field adapted to illuminate a target code at one of said focal distances and a second illumination field adapted to illuminate a target code at another of said focal distances;
   decoding circuitry for selecting a portion of an image of the field for decoding; and
   control circuitry for switching said solid state device lens assembly and illumination source.

19. An imaging lens system for a solid state device optical code reader comprising:
   an imaging lens assembly having a first angular field of view and a second angular field of view, wherein the lens assembly includes two objective lenses and switching means including mirror selectively positionable in a beam path of the solid state device to provide incident light from said first or said second lenses to the solid state device; and
   means for rapidly switching between said first and said second fields of view in response to detected distance between the reader and a target barcode, at which the reader is aimed.

20. The system of claim 19, wherein the mirror is a flip mirror.

21. The system of claim 20, wherein the flip mirror is servo controlled responsive a signal from a microprocessor of said reader.

22. An optical code reader comprising:
   a solid state device imaging system having at least two different fields of view;
   a laser; and
   a diffractive optical element for diffracting light from the laser and producing at least two different aiming pattern frames corresponding to the at least two different scanning fields of the solid state device imaging system.

23. The optical code reader of claim 22, wherein said diffractive optical element produces arrays of spots indicating the corners of the aiming pattern frames and a center marker.

24. The optical code reader of claim 23, wherein the two aiming patterns are nested aiming frames and wherein the center marker is a cross-hair pattern of spots located at the center of the two aiming frames.

25. An optical code reader comprising:
   a solid state device imaging system having at least one field of view;
   an aiming pattern projector for projecting an aiming pattern in the direction of a target barcode;
   a means for decoding a target optical code located in a field of view of the solid state device imaging system; and
   means for locating at least a portion of an aiming pattern in an image produced by the solid state device imaging system and for providing feedback to the decoding means to identify an image area in which the target barcode is located.

26. The optical code reader of claim 25, wherein a principal optical axis of said solid state device imaging system and a principal optical axis of the two aiming patterns are parallel and offset by a distance less than ½ inch.

27. The optical code reader of claim 26, wherein the location of at least a portion of at least one of said aiming patterns within an image produced by the solid state device is employed to determine the distance from the target to the reader.

28. The optical code reader of claim 26, wherein an image produced by the solid state device imaging system includes a center marker of said aiming patterns.

29. The optical code reader of claim 28, further comprising:
   a switchable illumination source; and
   means for analyzing the position of the center marker relative to the field of view of the reader to select an illumination level for a subsequent image to be decoded.

30. The optical code reader of claim 28, further comprising means for analyzing the position of the center marker relative to the field of view of the reader to select an exposure level for a subsequent image to be decoded.

31. The optical code reader of claim 28, further comprising:
   means for changing the focal distance of the CCD imaging system, and
   means for analyzing the position of the center marker relative to the field of view of the reader to select a focal distance for a subsequent image to be decoded.

32. A method for reading a target barcode comprising:
   projecting an aiming pattern from a handheld optical code reader in the direction of the target barcode;
   producing a signal corresponding to a two dimensional image with a field including at least a portion of the aiming pattern and the target barcode;
   identifying the location of at least a portion of the pattern within the two-dimensional image; and
   selecting a portion of an image of the field for decoding, relative to the identified location.

33. The method of claim 32, wherein the aiming pattern is projected by directing a laser beam through a diffractive optical element of a handheld scanner.

34. The method of claim 32, wherein the pattern includes a peripheral field frame.

35. The method of claim 32, wherein the two dimensional image includes the central marker.

36. The method of claim 32, wherein the aiming pattern is projected from a handheld scanner and wherein the signal corresponding to the two dimensional image is produced by a solid state device imaging system having a principal optical axis parallel to and offset from a principal optical axis of the aiming pattern.

37. The method of claim 36, further comprising the step of locating at least a portion of the aiming pattern within a two-dimensional image from said solid state device imaging system and producing a signal corresponding to the distance between the optical code reader and the target barcode based on the location of the position of the aiming pattern.

38. The method of claim 37, further comprising the step of switching a focal distance of the solid state device imaging system in response to the determined distance of the barcode.

39. The method of claim 38, further comprising the steps of illuminating the target barcode and selecting the amount of illumination based on the determined distance of the barcode.

40. The method of claim 32, wherein the aiming pattern is periodically projected and wherein two dimensional images of the field are produced, a first image being produced when the aiming pattern is being projected, and a second image being produced when the aiming pattern is not being projected, and wherein a portion of the second image is selected for decoding on the basis of the identified location in the first image.

41. An apparatus for determination of the distance between an imaging engine and a target barcode comprising:
   means for projecting an aiming pattern from an optical code reader in the direction of the target barcode, said aiming pattern having a principal optical axis;
   electro-optical means for producing a signal corresponding to a two dimensional image with a field including at least a portion of the aiming pattern and the target barcode, wherein the electro-optical means has a principal optical axis generally parallel and offset from the principal optical axis of the projecting means; and
   means for locating at least a portion of the aiming pattern within a two dimensional image detected by said electro-optical means and for producing a signal corresponding to the distance between the imaging engine and the target barcode based on the location of the position of the at least a portion of the aiming pattern.

42. The apparatus of claim 41, wherein the means for projecting projects a second aiming pattern from the optical code reader, the aiming pattern being associated with a first distance from the imaging engine and the second aiming pattern being associated with a second distance from the imaging engine.

43. The apparatus of claim 41, further comprising:
a lens assembly means being switchable between at least two different focal distances; and
an illumination means which is switchable to provide a first illumination field adapted to illuminate the target barcode at one of the focal distances and a second illumination field adapted to illuminate the target barcode at another of the focal distances.

44. A target illumination source for a handheld optical code reader comprising:
means for producing a broad beam of low output intensity to illuminate a target barcode close to the optical code reader; and
means for producing a narrower beam of higher output intensity to illuminate a target barcode far from the optical code reader.

45. The illumination source of claim 44, adapted for use with the reader which is switchable between a relatively larger and a relatively smaller field of view and wherein the beam of illumination is selected to correspond with the field of view of the reader.

46. The illumination source of claim 44, wherein the means for producing the lower output intensity illumination beam is one or more light emitting elements with a wide divergence pattern located relatively near a principal optical axis of the reader; and
wherein the means for producing the higher output intensity illumination beam is one or more light emitting elements with a narrow divergence pattern located relatively farther from a principal optical axis of the reader.

47. The illumination source of claim 44, wherein the means for producing the higher intensity, relatively narrower illumination beam is plural light emitting diodes each associated with a focusing lenslet located in a front face of the reader.

48. The illumination source of claim 44,
wherein the beam producing means are plural light emitting elements, which emit light from a forward face of the reader; and further comprising
an image sensor for producing electronic signals corresponding to a two dimensional array of pixel information for a field view; and
image processing means for compensating said signals for known variations in illumination of the beam producing means.

49. A method for determining a distance between an imaging engine and a target barcode comprising the steps of:
projecting an aiming pattern from an optical code reader in a direction of the target barcode, the aiming pattern having a principal optical axis;
producing, by electro-optical means, a signal corresponding to a two dimensional image with a field including at least a portion of the aiming pattern and the target barcode, wherein the electro-optical means has a principal optical axis generally parallel and offset from the principal optical axis of the aiming pattern; and
locating at least a portion of the aiming pattern within the two dimensional image; and
generating a signal corresponding to the distance between the imaging engine and the target barcode based on the location of the position of the at least a portion of the aiming pattern.

50. A method for determining a distance between an imaging engine and a target barcode comprising the steps of:
projecting a first and second aiming pattern from an optical code reader in the direction of the target barcode, wherein the first and second aiming patterns are associated with a first and second focal distance;
capturing an image of the first and second aiming patterns;
correlating an offset between the first projected aiming pattern and the second projected aiming pattern with the first and second focal distances;
calibrating the imagining engine using said correlation;
illuminating the target barcode using either the first or second aiming pattern; and
determining a distance of the between the imaging engine and the target barcode using an offset of a portion of either the first or second aiming pattern.

51. The method of claim 50, wherein the portion of either the first or second aiming pattern is a central marker of either the first or second aiming pattern.

52. An apparatus for determining a distance between a barcode reader and a target barcode comprising:
means for projecting a first aiming pattern onto a first target plane and for projecting a second aiming pattern onto a second target plane, wherein a portion of the first aiming pattern is offset from a portion of the second aiming patterns with respect to an axis;
means for correlating the offset of the portion of the first aiming pattern with a distance of the first target plane and for correlating the offset of the portion of the second aiming pattern with a distance of the second target plane; and
means for determining the distance between the barcode reader and the target barcode as a function of an offset of a portion of either the first or second aiming patterns.

* * * * *